(12) United States Patent
Li et al.

(10) Patent No.: US 9,646,392 B2
(45) Date of Patent: May 9, 2017

(54) METHOD AND DEVICE OF CONSTRUCTING UNIFORM COLOR SPACE DIRECTLY FROM RAW CAMERA RGB

(71) Applicant: MediaTek Singapore Pte. Ltd., Singapore (SG)

(72) Inventors: Ying-Yi Li, Taipei (TW); Hsien-Che Lee, Pleasanton, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 151 days.

(21) Appl. No.: 14/582,176

(22) Filed: Dec. 23, 2014

(65) Prior Publication Data

US 2016/0180552 A1 Jun. 23, 2016

(51) Int. Cl.
*G06T 11/00* (2006.01)
*G09G 5/06* (2006.01)

(52) U.S. Cl.
CPC .............. *G06T 11/001* (2013.01); *G09G 5/06* (2013.01); *G09G 2340/06* (2013.01)

(58) Field of Classification Search
CPC .... G09G 5/02; G09G 2340/06; H04N 1/6002; H04N 1/6005; H04N 1/6008; H04N 1/6058; H04N 1/6061
See application file for complete search history.

(56) References Cited

U.S. PATENT DOCUMENTS

| 7,218,344 B2* | 5/2007 | Cooper ................ H04N 1/6077 348/223.1 |
| 7,876,970 B2* | 1/2011 | Goma .................. H04N 1/6077 345/589 |
| 2009/0128835 A1* | 5/2009 | Yao ....................... H04N 1/6058 358/1.9 |
| 2011/0033108 A1* | 2/2011 | Tin ....................... H04N 1/6058 382/167 |

OTHER PUBLICATIONS

Li; Ying-Yl and Lee; Hsien-Che, DLAB: a class of daylight-based uniform color space, j. Opt. Soc. Am. A, vol. 31, No. 8, Aug. 2014, pp. 1876-1885.

* cited by examiner

*Primary Examiner* — Antonio A Caschera
(74) *Attorney, Agent, or Firm* — Han IP Corporation; Andy M. Han

(57) ABSTRACT

A method and an associated device construct a uniform color space from raw RGB data without going through any intermediate color space, such as CIEXYZ. A direction and a scale of each of first, second and third perceptual color axes may be determined based at least in part on the characteristics related to the imaging device, such that a first perceptual color axis correlates with lightness, a second perceptual color axis correlates with yellow-blue color variations, and a third perceptual color axis correlates with red-green color variations. The second perceptual color axis may be substantially aligned with typical daylight variation.

23 Claims, 14 Drawing Sheets

METHOD AND DEVICE OF CONSTRUCTING UNIFORM COLOR SPACE DIRECTLY FROM RAW CAMERA RGB

TECHNICAL FIELD

The inventive concept described herein is generally related to digital color image processing and, more particularly, to color conversion from raw camera RGB to a uniform color space with color attributes that correlate closely with human color perception.

BACKGROUND

Unless otherwise indicated herein, approaches described in this section are not prior art to the claims listed below and are not admitted to be prior art by inclusion in this section.

Digital color images are typically captured in the raw camera RGB space and displayed on monitors in a standard RGB space such as sRGB, for example. There are usually many image processing steps that take place to correct, manipulate, enhance, and convert a raw camera RGB image to a standard sRGB image. These image processing steps typically are done in the image signal processing (ISP) pipeline of a digital camera. Color manipulation, adjustment, and conversion are difficult to do effectively in RGB color space because the RGB color model does not map easily to color attributes that correlate closely with human color perception such as, for example, lightness, hue, and chroma. For instance, to avoid numerical overflow in processing bright and colorful objects, an approach is to simply clip RGB channels having numerical values that are too high or too low, such as those greater than 4095 (for 12-bit processing) or those less than 0. Color clipping in RGB space tends to change the hue dramatically. As a result, a bright and colorful purple flower may turn into red color as its blue channel is clipped, while skin color may become bright yellow around specular highlights when its red channel is clipped. Yet, another important step in color processing is to increase the colorfulness of natural images, where dull and low-contrast images may be processed to have enhanced color chroma, thus making such images look better. This is commonly done in advertisements and is becoming a common feature of digital cameras.

A key to doing color adjustment well is to transform colors from an RGB color space to a color space that is much better correlated with color appearance description, such as CIE 1976 L*a*b* (CIELAB) or CIE 1976 L*u*v* (CIELUV) uniform color spaces. For example, in CIELAB space, the angle between a* and b* axes is well correlated with the hue of a color, the L* is well correlated with its lightness, and the distance from (a*, b*) to (0, 0) is well correlated with its perceived chroma.

Although CIELAB is widely useful and highly successful in practical applications, it is not directly applicable to the majority of imaging devices, such as smartphone cameras, digital cameras, and document scanners. This is because CIELAB is based on XYZ tristimulus values calculated from CIE 1931 xyz color matching functions. In order to transform camera RGB to CIE XYZ, a standard practice is to use a customized 3×3 matrix for the color conversion. This practice may work well when the camera spectral sensitivities, herein interchangeably referred to as spectral sensitivity functions or sensor fundamentals, can be well approximated by linear combinations of the CIE 1931 xyz color matching functions. However, most smartphone cameras and consumer digital cameras fall far short of this condition due to the high manufacturing cost of color filters that can provide such a good approximation. Therefore, RGB transformation by a 3×3 matrix cannot produce good matches for the corresponding object colors in CIE XYZ values. Errors in such matrix transformation can be especially large for certain object colors. Furthermore, the output from a matrix transformation can be negative and not physically meaningful. When such condition happens, it is difficult to make a perceptually meaningful correction.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 1:
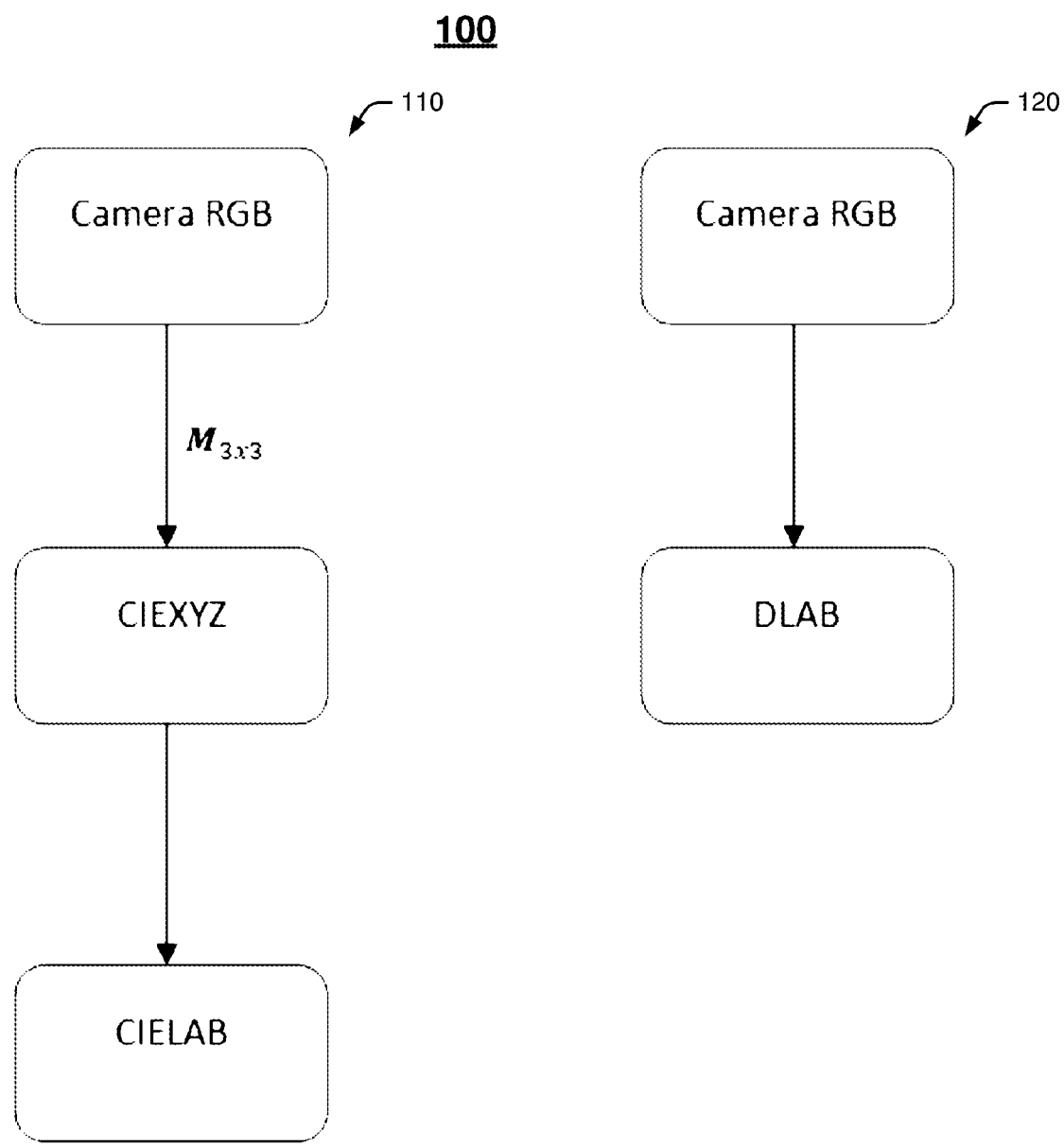
FIG. 1 is a diagram showing a comparison between a conventional technique and a novel and non-obvious technique in accordance with an embodiment of the present disclosure.

FIG. 1 is a diagram showing a comparison 100 between a conventional technique 110 and a novel and non-obvious technique 120 in accordance with an embodiment of the present disclosure.

The CIE 1976 L*a*b* color space, abbreviated as CIELAB, is defined as follows:

$$L^* = 116 f\left(\frac{Y}{Y_n}\right) - 16,$$

$$a^* = 500\left[f\left(\frac{X}{X_n}\right) - f\left(\frac{Y}{Y_n}\right)\right],$$

$$b^* = 200\left[f\left(\frac{Y}{Y_n}\right) - f\left(\frac{Z}{Z_n}\right)\right],$$

where $f(t) \stackrel{\Delta}{=} t^{\frac{1}{3}}$ if $t > \left(\frac{24}{116}\right)^3$, or else $f(t) = \left(\frac{841}{108}\right)t + \frac{16}{116}$ with (X,Y,Z) and $(X_n, Y_n, Z_n)$ being the CIE 1931 tristimulus values of the test object color stimulus and the specified white object color stimulus. In order to convert camera RGB to CIELAB, it is necessary to involve a two-step process of first converting camera RGB to CIE XYZ and then from CIE XYZ to CIELAB. As shown in FIG. 1, a conventional approach 110 requires a first conversion from camera RGB to CIE XYZ, e.g., via 3×3 matrix or other linear or nonlinear transformations, followed by a second conversion from CIE XYZ to CIELAB. However, information associated with the image may potentially be lost in the conversion from camera RGB to CIE XYZ.

Embodiments of methods and systems according to the present disclosure construct a uniform color space (hereinafter referred to as "DLAB") directly from camera RGB without going through CIE XYZ, thus avoiding or at least minimizing potential information loss in the conversion from camera RGB to CIE XYZ. As shown in FIG. 1, a novel and non-obvious approach 120 according to the present disclosure converts camera RGB directly to DLAB.

Figure 2:
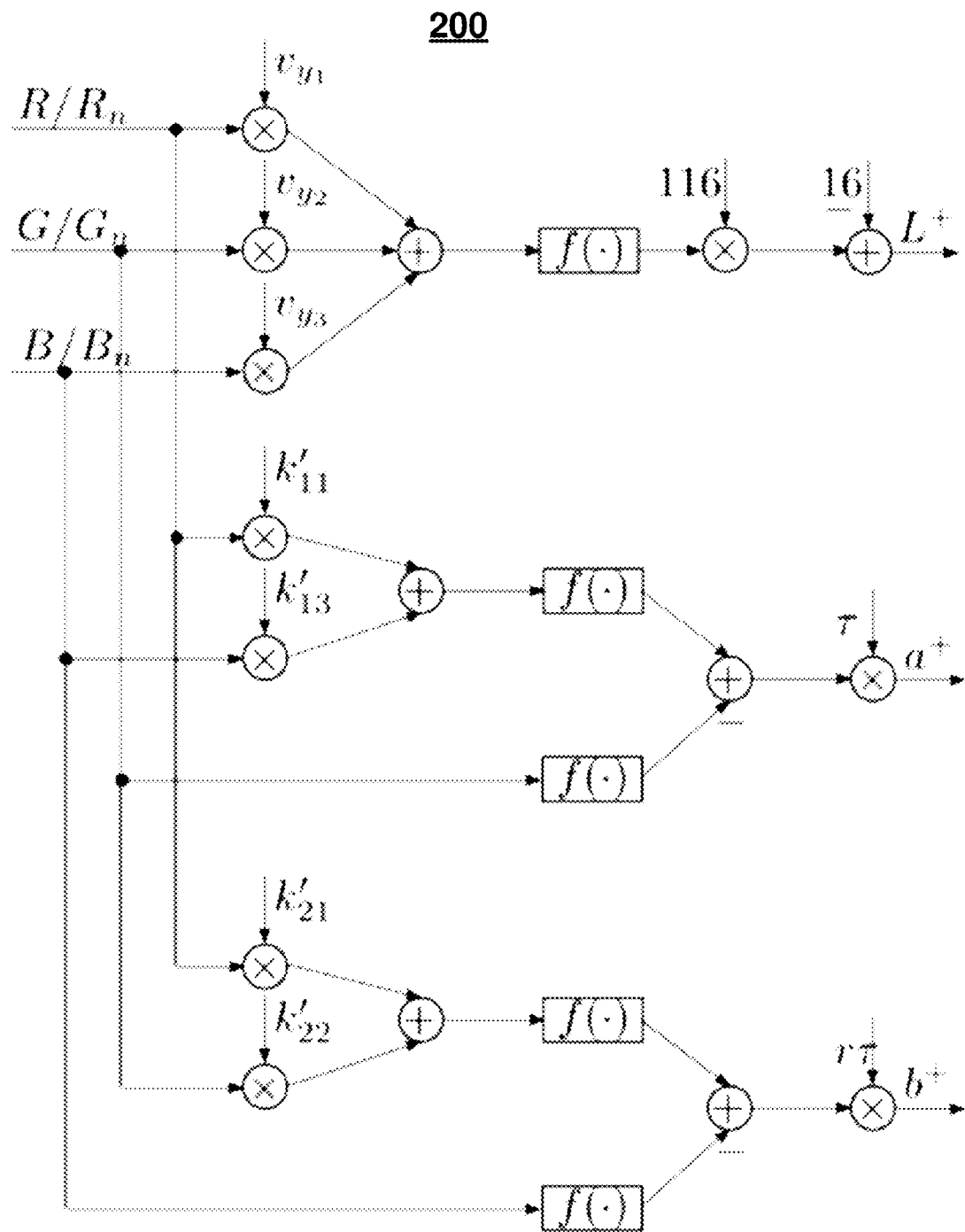
FIG. 2 is a schematic diagram showing an example logic for conversion from RGB to a uniform color space, or DLAB, in accordance with an embodiment of the present disclosure.

FIG. 2 is a schematic diagram showing an example logic 200 for conversion from RGB to DLAB in accordance with an embodiment of the present disclosure. Logic 200 and any variation thereof may be implemented in a circuit, e.g., in a chip such as an image signal processor, with $R/R_n$, $G/G_n$, and $B/B_n$ as input parameters (where one image corresponds to one set of $R_n$, $G_n$, and $B_n$ while values of R, G, and B are different for each pixel) and $L^+$, $a^+$ and $b^+$ as the output parameters. The other parameters shown in FIG. 2 are coefficients that may be pre-computed, and may be saved in storage, e.g., registers or memory of a chip, for use and/or modified by user. Detailed computations associated with logic 200 when spectral sensitivity functions are known and unknown are described later.

According to an embodiment of the present disclosure, the three axes of DLAB are lightness $L^+$, red-green $a^+$ and yellow-blue $b^+$ (daylight direction or locus). In other embodiments, the $L^+$ axis may be determined by fitting the constant Munsell value plane, the $b^+$ axis may be determined from the daylight plane, and the $a^+$ axis may be in an axis in the orthogonal direction with respect to the $b^+$ axis.

The present disclosure uncovers three major observations that form the basis of constructing a uniform color space directly from camera RGB: (1) daylight locus is very well approximated as a plane in log R, log G, and log B color space for almost all digital imaging devices; (2) daylight locus closely approximates the major axis of the Munsell colors; and (3) daylight locus is also approximately a plane in normalized linear RGB color space with a surface normal vector similar to that in log R, log G, log B color space.

Based on these three observations, the present disclosure provides two methods of constructing DLAB, which is a uniform color space, directly from camera RGB without going through CIE XYZ conversion, depending on the availability of the spectral sensitivity functions of the imaging device, e.g., smartphone cameras, digital cameras, document scanners, etc. In particular, one method constructs DLAB when the spectral sensitivity functions of the imaging device are known, and the other method constructs DLAB when the spectral sensitivity functions are unknown. The present disclosure further provides a method for computing the inverse transform of DLAB so that conversion between the uniform color space and camera RGB can be carried out back and forth.

The choice of the yellow-blue axis in the construction of DLAB is based on at least two reasons. Firstly, the yellow-blue axis is generally aligned with the human color perception as well as the daylight locus. Secondly, once DLAB is implemented in various cameras and imaging devices, each camera or imaging device has an axis aligned with the daylight locus in the uniform color space. This allows a direct color transformation from one camera/imaging device to another camera/imaging device. Each camera or imaging device in which embodiments of the present disclosure are implemented converts its RGB to DLAB which can be converted to a different camera's RGB by using the inverse transform of DLAB. That is, with conversion of N different cameras/imaging devices, the present disclosure limits the number of calibrations necessary to N instead of N(N−1)/2 as with conventional approaches in which no DLAB is defined or used. Moreover, it will be understood by those skilled in the art that an axis of another color that is generally aligned with one of the perceptual opponent color processes may alternatively be chosen for DLAB in lieu of the red-green axis. In other words, daylight is fixed at the yellow-blue direction and currently the orthogonal of daylight is chosen as the red-green direction; however, any color that is close to the red-green axis may be chosen to align with the red-green axis. For example, an axis of the color of foliage may be used for DLAB in lieu of the red-green axis.

Embodiments of the present disclosure may construct a uniform color space, or DLAB, directly from camera RGB, without having to rely on any conversion to CIE XYZ. Such a direct construction can reduce information loss, especially when the camera spectral sensitivities are very different from the CIE 1931 xyz color matching functions. Embodiments of the present disclosure may align one of the chromatic axes of DLAB with the CIE daylight vector, which is also parallel to the b*-axis of CIELAB at a correlated color temperature of 7200 K. In doing so, all DLAB color spaces constructed by methods and systems according to the present disclosure will have at least one well-aligned opponent color process. Embodiments of the present disclosure may also scale DLAB lightness and color axes so that their distances correlate well with the same color differences as those in CIELAB.

Embodiments of the present disclosure may be implemented in various applications such as, for example, an electronic apparatus equipped with an imaging device or a chip or chipset operating with an imaging device and configured to perform operations according to the present disclosure.

Example 1

When the spectral sensitivity functions of the imaging device are known, embodiments of the present disclosure may compute the RGB values of Munsell colors from their measured and corrected spectral reflectance functions. For instance, a chip vendor that provides chips or chipsets in which one or more embodiments of the present disclosure are implemented may have information or data pertaining to the spectral sensitivity functions of various imaging devices, e.g., sensors or assemblies of sensor and lens. In such case coefficients of DLAB may be pre-computed for those imaging devices and programmed into the chips or chipsets by the vendor.

Munsell colors are arranged according to value, hue, and chroma. Colors of the same Munsell value are of the same CIELAB lightness, and these colors of the same Munsell value may be used to determine a constant-value plane. Since the spectral sensitivity functions are known, embodiments of the present disclosure may also calculate the RGB values for CIE daylight colors at various correlated color temperatures. These daylight RGB values form a plane in log R, log G, and log B color space. Moreover, the normalized linear daylight RGB values also form a slightly curved surface which is well approximated as a plane, herein referred to as the daylight plane.

In some embodiments, an algorithmic procedure of constructing DLAB may include the following: (1) finding the normal vector of the daylight plane, $n_d$; (2) finding the normal vector of constant-value plane, $v_y$; (3) finding the intersection of $n_d$ and $v_y$ planes, $b^+$; (4) finding the orthogonal direction of $b^+$, $a^+$; (5) finding the transformation matrix, K; (6) performing nonlinear transformation, $f(\bullet)$; and (7) finding scale factors, r and τ.

Figure 3:
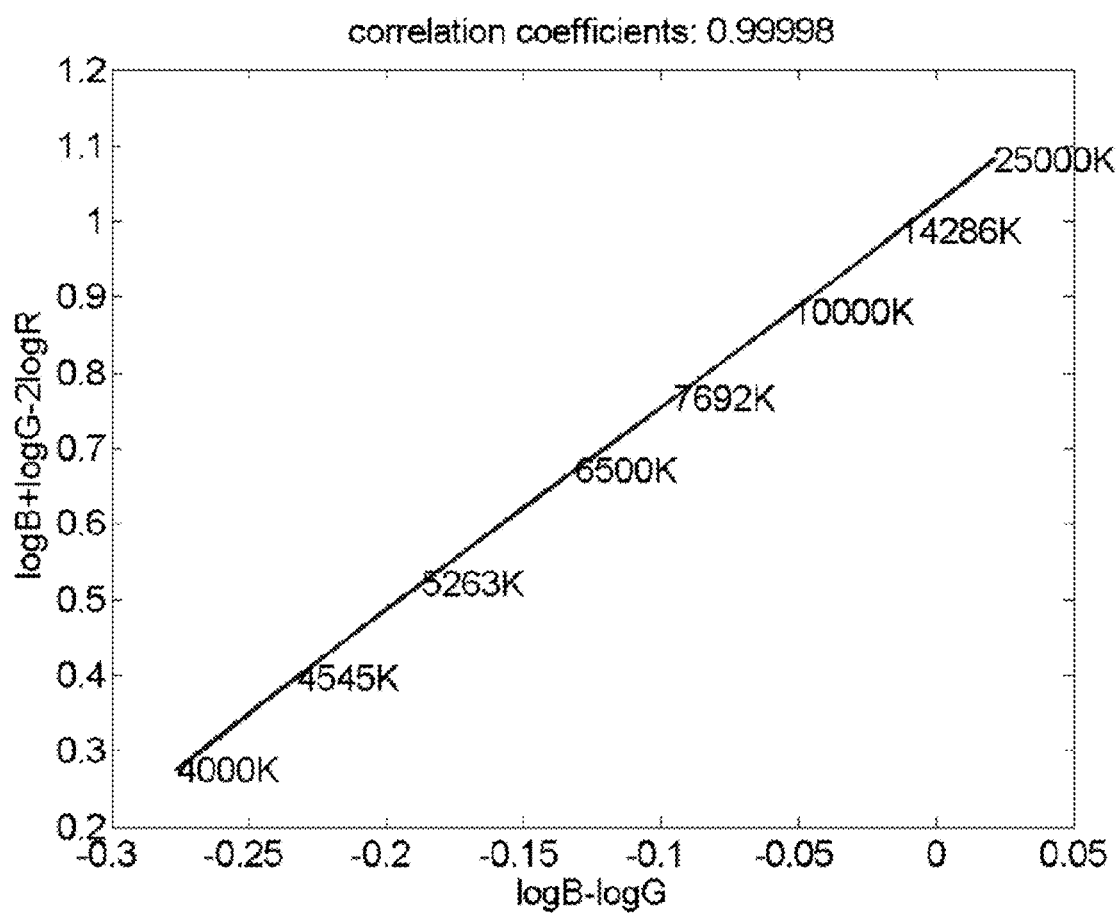
FIG. 3 is a chart showing the CIE daylight locus (4000 to 25000 K) for a first camera.

FIG. 3 is a chart 300 showing the CIE daylight locus (4000 to 25000 K) for a first camera.

In experiments conducted by inventors of the present disclosure, the first camera (a consumer camera and herein referred to as Camera A) was used in the derivation although DLAB may be designed for and implemented in various trichromatic imaging systems. The input RGB values used in DLAB are normalized by reference white $R_n$, $G_n$, and $B_n$, e.g., determined by an auto-white balance algorithm. The output of the DLAB includes lightness, $L^+$, and chromatic coordinates, $a^+$ and $b^+$. DLAB may use the same cube root nonlinear transform, $f(t)$, as CIELAB. The lightness, $L^+$, is the cube root transform of a linear combination of normalized RGB. The chromatic coordinates, $a^+$ and $b^+$, are differences of cube root transforms of linear combinations of normalized RGB as well. However, the nonlinear mapping functions are performed on the positive terms and negative terms separately. The input includes normalized sensor responses of an image sensor, e.g., a CMOS image sensor. The output includes ($L^+$,$a^+$,$b^+$). The coefficients, $v_{y_1}$, $v_{y_2}$, and $v_{y_3}$, are computed from constant Munsell value planes. The coefficients, $k_{11}'$, $k_{13}'$, $k_{21}'$ and $k_{22}'$, are computed from the daylight plane and its orthogonal direction. Note that positive and negative terms are grouped separately and then mapped through the nonlinear function. The scaling factors, r and τ, are determined to match Munsell chromas and CIELAB step size.

The daylight locus in the logarithmic space can be approximated by a straight line on a constant-intensity plane, and used as one of the chromatic basis vectors. The CIE daylight locus from 4000K to 25000K on the intensity-invariant plane is computed for Camera A. The daylight locus becomes virtually a straight line, as shown in FIG. 3. The normal vector of the daylight plane, $n_d$, for Camera A is $n_d=[0.4415, -0.8156, 0.3741]^T$.

Figure 4A:
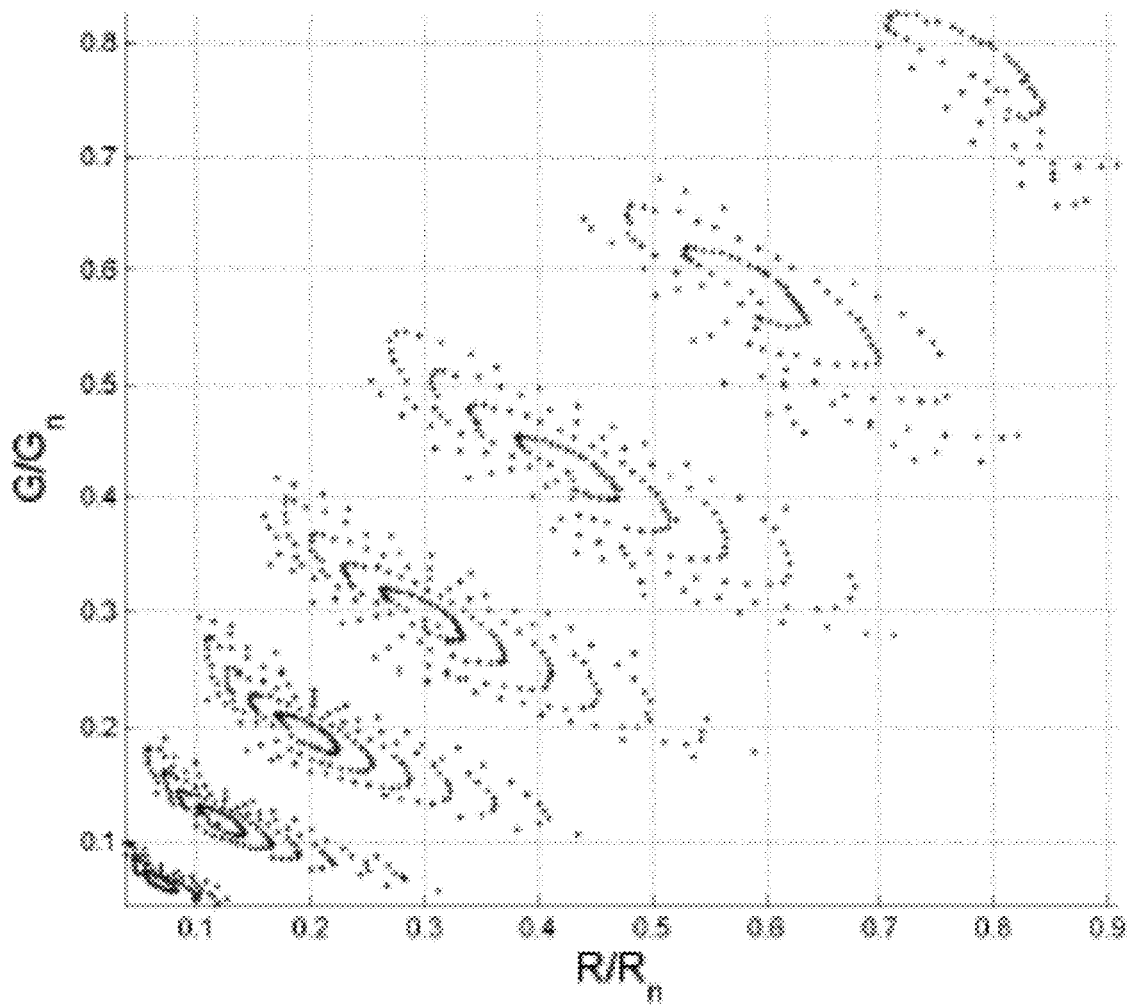
FIG. 4A is a chart showing a first perspective of three-dimensional (3-D) distribution of Munsell color data under illuminant C in RGB of the first camera of FIG. 3.
Figure 4B:
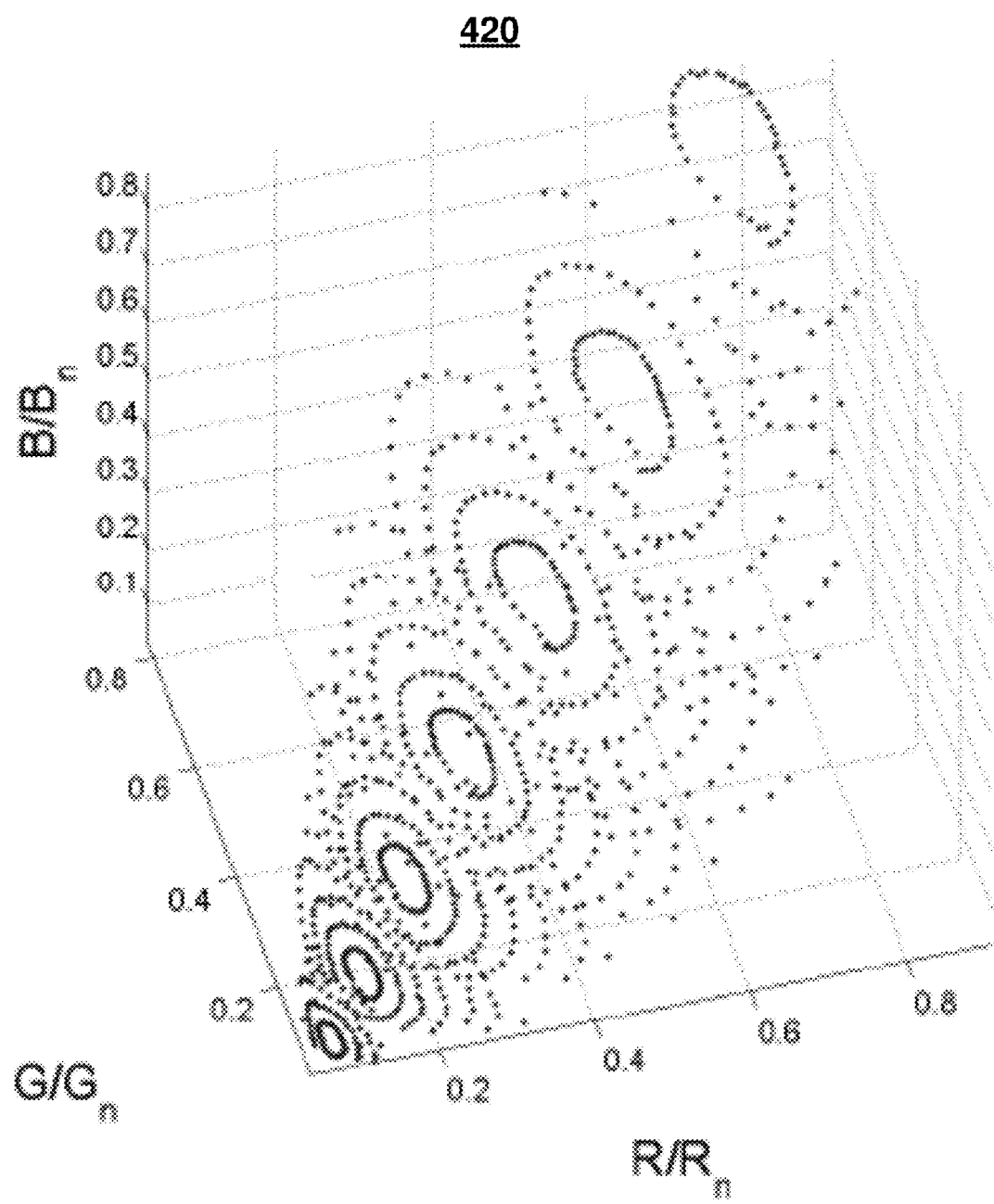
FIG. 4B is a chart showing a second perspective of 3-D distribution of Munsell color data under illuminant C in RGB of the first camera of FIG. 3.
Figure 4C:
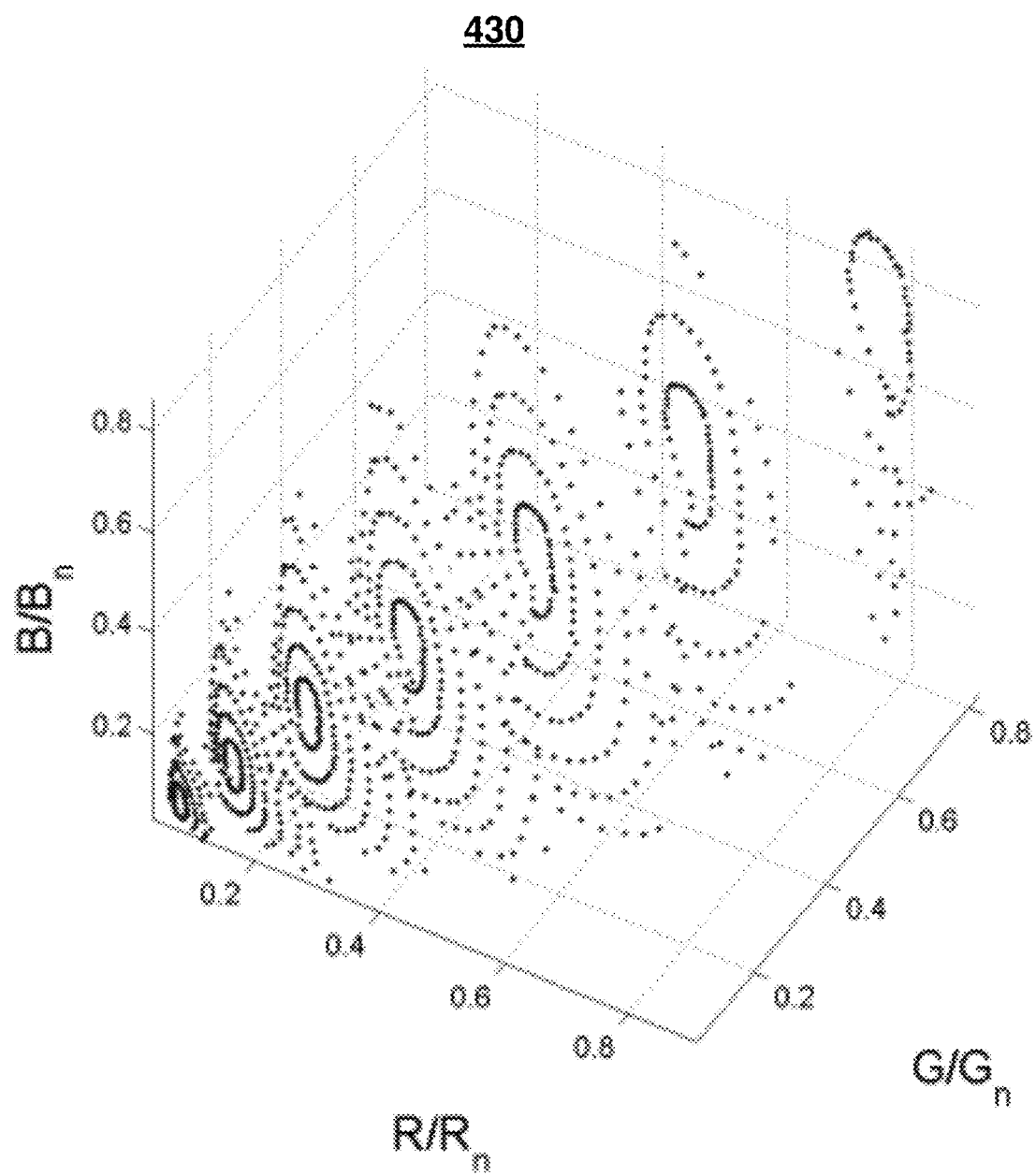
FIG. 4C is a chart showing a third perspective of 3-D distribution of Munsell color data under illuminant C in RGB of the first camera of FIG. 3.

FIG. 4A, FIG. 4B and FIG. 4C show three perspectives of 3-D distribution of Munsell color data under illuminant C in RGB of Camera A. In particular, chart 410 of FIG. 4A shows the first perspective, chart 420 of FIG. 4B shows the second perspective, and chart 430 of FIG. 4C shows the third perspective. In FIG. 4A, FIG. 4B and FIG. 4C, each group of concentric eclipses is associated with a particular value of Munsell lightness. As can be seen in FIG. 4A, FIG. 4B and FIG. 4C, the constant-value plane has a certain slope and is not perpendicular to any axis of $R/R_n$, $G/G_n$, and $B/B_n$.

From the distribution of Munsell color data in 3-D plot, as shown in FIGS. 4A-4C, it can be observed that Munsell RGB under illuminant C has similar ellipses for each value. Furthermore, for a given Munsell value, Munsell colors are on a constant-luminance plane. In order to find the plane of constant Munsell value, luminance Y is approximated by the linear combination of RGB by Equation (1) below:

$$\begin{bmatrix} R_1/R_n & G_1/G_n & B_1/B_n \\ R_2/R_n & G_2/G_n & B_2/B_n \\ \vdots & \vdots & \vdots \\ R_t/R_n & G_t/G_n & B_t/B_n \end{bmatrix} v_y = \begin{bmatrix} Y_1/Y_n \\ Y_2/Y_n \\ \vdots \\ Y_t/Y_n \end{bmatrix},$$

where $R_i$, $G_i$, $B_i$, and $Y_i$ are the Munsell RGB responses and the luminances of the Munsell values, and t is the total number of Munsell colors, which is 1021 for the experiments conducted by the inventors. Here, $v_y=[v_{y_1},v_{y_2},v_{y_3}]^T$ is the surface normal vector of constant-value plane and the direction for lightness.

Given a normalized Munsell RGB point $q=[R/R_n,G/G_n,B/B_n]^T$, the lightness $L^+$ of DLAB has the same scale as the of CIELAB as expressed by Equation (2) below:

$$L^+=116f(v_y^T q)-16.$$

In the normalized RGB space, the neutral colors have equal normalized RGB values, i.e., $\dfrac{R}{R_n} = \dfrac{G}{G_n} = \dfrac{B}{B_n}.$ In order to let the reference white be the center on Munsell constant-value plane, the center direction of the plane is set to $o=[1,1,1]^T$. Given a normalized Munsell RGB point q on the plane with normal vector $n_p$, normalized vector of $v_y$, where $n_p=v_y/\sqrt{v_{y_1}^2+v_{y_2}^2+v_{y_3}^2}$, the center of the plane, $o_q$, may be shifted to (0,0) since q and $o_q$ are on the same plane with normal vector $n_p$, $n_p^T q=n_p^T o_q$. In addition, $o_q$ is on the direction of $o=[1,1,1]^T$. Therefore, the center of the plane, $o_q$, can be expressed as $o_q=(n_p^T q/n_p^T o_q)o$. Let $n_p=[n_{p_n},n_{p_n},n_{p_n}]^T$, and $v_{n_p}=n_{p_1}+n_{p_2}+n_{p_3}$. The shifted point, $q'=q-o_q$, is expressed as Equation (3) below:

$$q' = \begin{bmatrix} \dfrac{R}{R_n} \\ \dfrac{G}{G_n} \\ \dfrac{B}{B_n} \end{bmatrix} - \dfrac{n_{p_1}\dfrac{R}{R_n}+n_{p_2}\dfrac{G}{G_n}+n_{p_3}\dfrac{B}{B_n}}{v_{n_p}} \begin{bmatrix} 1 \\ 1 \\ 1 \end{bmatrix}$$

$$= \dfrac{1}{v_{n_p}} \begin{bmatrix} n_{p_2}+n_{p_3} & -n_{p_2} & -n_{p_3} \\ -n_{p_1} & n_{p_1}+n_{p_3} & -n_{p_3} \\ -n_{p_1} & -n_{p_2} & n_{p_1}+n_{p_2} \end{bmatrix} q.$$

Daylight direction is chosen as the $b^+$ opponent process. The daylight direction on the Munsell constant-value plane is the intersection of daylight plane and Munsell value plane. Therefore, the intersection line of these two planes is given by the cross product of the two normal vectors, expressed as Equation (4) below:

$$b^+ = n_d \times n_p.$$

The other opponent process, a', is chosen as the orthogonal of b' opponent process. Accordingly, Equation (5) below is obtained:

$$a^+ = n_p \times b^+.$$

The transformation matrix, K, that projects the RGB values to $a^+$ and $b^+$ axes can be determined by Equation (6) below:

$$\begin{bmatrix} a^+_{linear} \\ b^+_{linear} \end{bmatrix} = \begin{bmatrix} a^{+T} \\ b^{+T} \end{bmatrix} q'$$

$$= \frac{1}{v_{n_p}} \begin{bmatrix} a^{+T} \\ b^{+T} \end{bmatrix} \begin{bmatrix} n_{p_2}+n_{p_3} & -n_{p_2} & -n_{p_3} \\ -n_{p_1} & n_{p_1}+n_{p_3} & -n_{p_3} \\ -n_{p_1} & -n_{p_2} & n_{p_1}+n_{p_2} \end{bmatrix} q$$

$$= \begin{bmatrix} k_{11} & k_{12} & k_{13} \\ k_{21} & k_{22} & k_{23} \end{bmatrix} q = Kq.$$

Since it is desirable that the opponents $a^+$ and $b^+$ look like CIELAB $a^*$ and $b^*$, nonlinear mapping on positive and negative $k_{ij}$'s is performed separately. From the observations made by the inventors, $k_{12}$ and $k_{23}$ are negative. Since the weight of each color channel response is relative, in some embodiments the coefficients of the negative terms are set to $-1$ and the weight for the positive terms are normalized. Thus, the two opponent color processes, $a_{ns}^+$ and $b_{ns}^+$, before global scaling are defined by Equations (7) and (8) below:

$$a_{ns}^+ = f\left(k'_{11}\frac{R}{R_n} + k'_{13}\frac{B}{B_n}\right) - f\left(\frac{G}{G_n}\right),$$

$$b_{ns}^+ = f\left(k'_{21}\frac{R}{R_n} + k'_{22}\frac{G}{G_n}\right) - f\left(\frac{D}{B_n}\right),$$

where $k'_{1j} = -k_{1j}/k_{12}$, and $k'_{2j} = -k_{2j}/k_{23}$.

The $a_{ns}^+$ and $b_{ns}^+$ of Munsell are still ellipses, not circles. Therefore, singular value decomposition (SVD) is applied on $a_{ns}^+$ and $b_{ns}^+$ to find the ratio between them, as shown in Equation (9) below:

$$\begin{bmatrix} a^+_{ns_1} & b^+_{ns_1} \\ a^+_{ns_2} & b^+_{ns_2} \\ \vdots & \vdots \\ a^+_{ns_{1021}} & b^+_{ns_{1021}} \end{bmatrix} = U_{ns} \Sigma_{ns} V_{ns}^T,$$

where $$\Sigma_{ns} = \begin{bmatrix} \sigma_{ns_1} & 0 \\ 0 & \sigma_{ns_2} \\ 0 & 0 \\ \vdots & \vdots \\ 0 & 0 \end{bmatrix}.$$

The ratio, r, of the first two singular values, $\sigma_{ns_1}$ and $\sigma_{ns_2}$, is used to adjust the shape of ellipses and let them be close to circles. Additionally, $b_{ns}^+$ is rescaled by multiplying r, which is defined as Equation (10) below:

$$r = \sigma_{ns_2}/\sigma_{ns_1}.$$

In order to make DLAB to have the same scale with CIELAB, SVD is applied to CIELAB under illuminant C and the rescaled ellipses, respectively, as expressed by Equations (11) and (12) below:

$$\begin{bmatrix} a^+_1 & b^+_1 \\ a^+_2 & b^+_2 \\ \vdots & \vdots \\ a^+_{1021} & b^+_{1021} \end{bmatrix} = U_c \Sigma_c V_c^T,$$

where $a_i^+$ and $b_i^+$ are CIELAB chromatic coordinates for Munsell color i, and $$\begin{bmatrix} a^+_{ns_1} & rb^+_{ns_1} \\ a^+_{ns_2} & rb^+_{ns_2} \\ \vdots & \vdots \\ a^+_{ns_{1021}} & rb^+_{ns_{1021}} \end{bmatrix} = U_s \Sigma_s V_s^T,$$

The rescaled ellipses are close to circles, which are close to the shape of CIELAB. Thus, the scaling factor, $\tau$, is the ratio of sum of singular values. Let $$\Sigma_c = \begin{bmatrix} \sigma_{c_1} & 0 \\ 0 & \sigma_{c_2} \\ 0 & 0 \\ \vdots & \vdots \\ 0 & 0 \end{bmatrix} \text{ and } \Sigma_s = \begin{bmatrix} \sigma_{s_1} & 0 \\ 0 & \sigma_{s_2} \\ 0 & 0 \\ \vdots & \vdots \\ 0 & 0 \end{bmatrix}.$$

The scaling factor for DLAB is defined by Equation (13) below:

$$\tau = \frac{\sigma_{c_1} + \sigma_{c_2}}{\sigma_{s_1} + \sigma_{s_2}}.$$

Therefore, the two chromatic coordinates for DLAB are expressed by Equations (14) and (15) below:

$$a^+ = \tau\left[f\left(k'_{11}\frac{R}{R_n} + k'_{13}\frac{R}{B_n}\right) - f\left(\frac{G}{G_n}\right)\right],$$

$$b^+ = r\tau\left[f\left(k'_{21}\frac{R}{R_n} + k'_{22}\frac{G}{G_n}\right) - f\left(\frac{B}{B_n}\right)\right].$$

Example 2

When the camera spectral sensitivity functions are unknown, images of a color target with known Munsell color notations or spectral reflectance functions, such as a Macbeth color checker or any other suitable color checker, may be taken to obtain raw camera RGB values. For instance, a chip vendor that provides chips or chipsets in which one or more embodiments of the present disclosure are implemented may not have information or data pertaining to the spectral sensitivity functions of various imaging devices, e.g., sensors or assemblies of sensor and lens. In such case, a user of a portable electronics apparatus equipped with an imaging device and a chip or chipset in which one or more embodiments of the present disclosure are implemented can take a number of images of the color target. Based on these images, the chip or chipset in the portable electronic apparatus may be able to construct DLAB, e.g., by least square fitting using techniques described below regarding FIG. 5.

Since the CIE xyY and Munsell hue, value, and chroma from the known spectral reflectance functions of the color target, such as a Macbeth color checker, can be computed, such information may be used for each color patch. For example, CIE Y can be used to evaluate the normal vector of constant-value plane and hue plus chroma information can be used to evaluate the scale factors for two opponent axes.

Construction of DLAB from a known color target is similar to the algorithmic procedure described above when camera spectral sensitivity functions are known. For illustrative purpose and not intended to limit the scope of the present disclosure, the Macbeth color checker is used as the color target to explain the algorithmic procedure. For those skilled in the art, the same construction process may work for various color targets that have sufficiently many color patches covering an adequate range of Munsell hue, value, and chroma. The input RGB values used in DLAB are normalized by the reference white $R_n$, $G_n$, and $B_n$. For an image with Macbeth color checker, reference white is scaled RGB of the white color patch. Since the reflectance of the white color patch is 90%, reference white is 10/9 of white color patch. Details of the procedure are described below.

Figure 5:
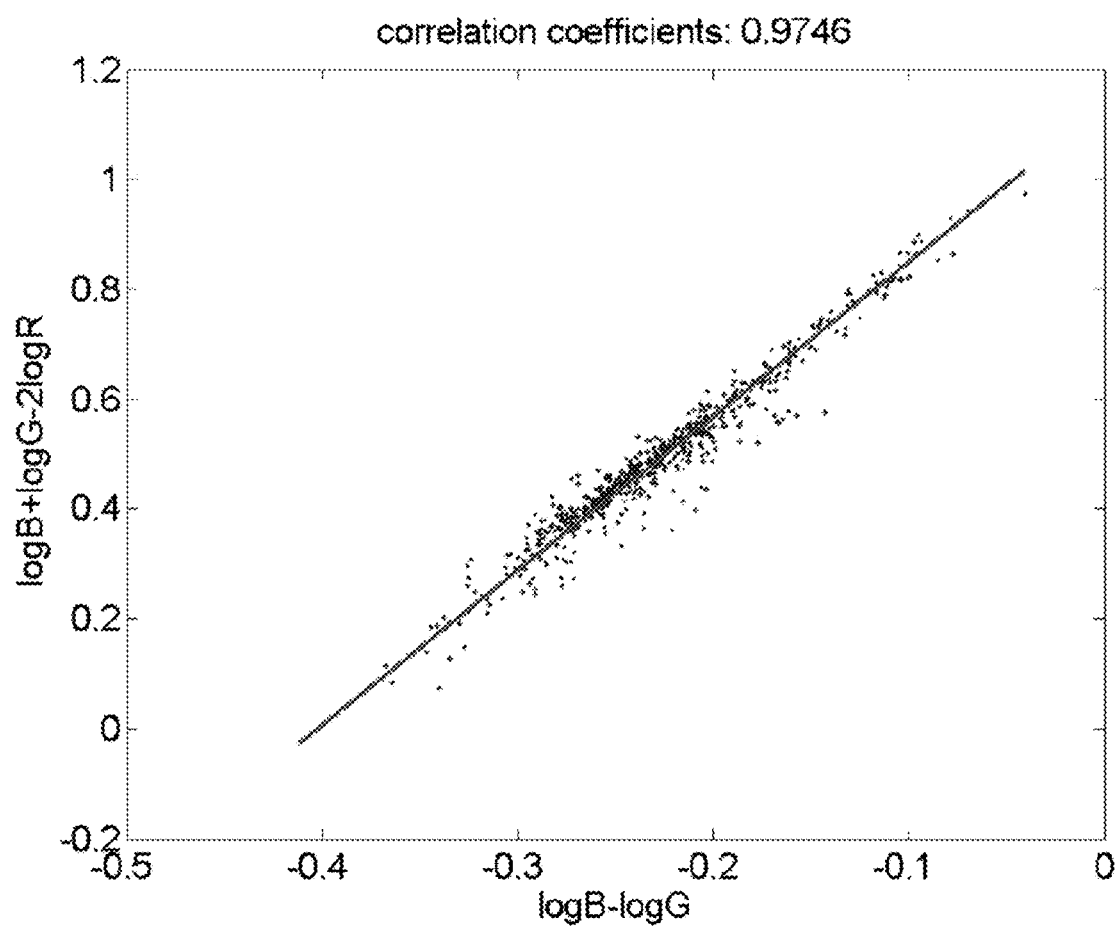
FIG. 5 is a chart showing daylight locus in the logarithmic space for a second camera.

FIG. 5 is a chart 500 showing daylight locus in the logarithmic space for a second camera.

The daylight locus in the logarithmic space can be approximated by a straight line on a constant-intensity plane, and used as one of the chromatic basis vectors. The daylight direction of a camera sensor can be estimated from images taken under various phases of daylight. FIG. 5 shows the daylight locus in the logarithmic space for the second camera (a consumer camera and herein referred to as Camera B). Each point in FIG. 5 is related to the RGB values of the gray card in an image taken from outdoor. For example, the line is fitted by minimizing the sum of the squares of the perpendicular distances from the observed points to the line to be determined. The slope m of the line is used to calculate the daylight direction $n_d$, as expressed by Equation (16) below:

$$n_d = \frac{[2 \ -m-1 \ m-1]^T}{\sqrt{2m^2 + 6}}.$$

In order to find the plane of constant Munsell value, luminance Y is approximated by the linear combination of RGB, as expressed by Equation (17) below:

$$\begin{bmatrix} R_1/R_n & G_1/G_n & B_1/B_n \\ R_2/R_n & G_2/G_n & B_2/B_n \\ \vdots & \vdots & \vdots \\ R_{24}/R_n & G_{24}/G_n & B_{24}/B_n \end{bmatrix} v_y = \begin{bmatrix} Y_1/Y_n \\ Y_2/Y_n \\ \vdots \\ Y_{24}/Y_n \end{bmatrix},$$

where $R_i$, $G_i$, and $B_i$ are the RGB values of Macbeth color checker taken from the camera sensor. In particular, $Y_i$ is the luminance of the Macbeth color checker, and i is the color patch index. Here, i=19 is the white color patch. Therefore, $[R_n \ G_n \ B_n]=10/9[R_{19} \ G_{19} \ B_{19}]$ is the reference white. The normal vector of constant-value plane, $v_y=[v_{y_n},v_{y_n},v_{y_n}]^T$, can be found by least square fitting.

Given a normalized RGB values $q=[R/R_n,G/G_n,B/B_n]^T$, the lightness $L^+$ of DLAB has the same scale as the of CIELAB, as expressed by Equation (18) below:

$$L^+ = 116 f(v_y^T q) - 16.$$

When $n_d$ and $v_y$ are known, the two opponent color processes, $a_{ns}^+$ and $b_{ns}^+$, before global scaling can be calculated. In order to estimate the scale of two opponents, it is assumed that the radius r of one Munsell chroma step in CIELAB is 5.5524, which is estimated from CIELAB. The scale of two opponents, $s_1$ and $s_2$, are estimated from least square fitting, as expressed by Equation (19) below:

$$\begin{bmatrix} a_{ns_1}^{+2} & b_{ns_1}^{+2} \\ a_{ns_2}^{+2} & b_{ns_2}^{+2} \\ \vdots & \vdots \\ a_{ns_{18}}^{+2} & b_{ns_{18}}^{+2} \end{bmatrix} \begin{bmatrix} s_1^2 \\ s_2^2 \end{bmatrix} = \begin{bmatrix} r^2 chroma_1^2 \\ r^2 chroma_2^2 \\ \vdots \\ r^2 chroma_{18}^2 \end{bmatrix},$$

where $a_{ns_1}^+$ and $b_{ns_1}^+$ are the non-scale opponents of Macbeth color checker, and $chroma_i$ are the chroma values of Macbeth color checker. Here, i is the color patch index. Since the six patches on the last row of Macbeth color checker are neutral with chroma=0, a quantity of eighteen colors are used to estimate the scalars, $s_1$ and $s_2$. Therefore, the two chromatic coordinates for DLAB are expressed as expressed by Equations (20) and (21) below:

$$a^+ = s_1 \left[ f\left(k'_{11}\frac{R}{R_n} + k'_{13}\frac{B}{B_n}\right) - f\left(\frac{G}{G_n}\right) \right],$$

$$b^+ = s_2 \left[ f\left(k'_{21}\frac{R}{R_n} + k'_{22}\frac{G}{G_n}\right) - f\left(\frac{B}{B_n}\right) \right].$$

Example 3

The present disclosure also provides a method for computing the inverse transform of DLAB. For example, this method allows conversion of data associated with an image from DLAB to corresponding linear sRGB. This also allows adjustment or tuning of an image (or the data thereof) in DLAB by first converting from RGB space to DLAB for the adjustment or tuning, followed by conversion from DLAB back to RGB space (whether camera RGB or sRGB).

The values of $L^+$, $a^+$ and $b^+$ are defined by Equations (22), (23) and (24) below:

$$L^+ = 116 f\left(v_{y_1}\frac{R}{R_n} + v_{y_2}\frac{G}{G_n} + v_{y_3}\frac{B}{B_n}\right) - 16,$$

$$a^+ = s_1 \left[ f\left(k'_{11}\frac{R}{R_n} + k'_{13}\frac{B}{B_n}\right) - f\left(\frac{G}{G_n}\right) \right],$$

$$b^+ = s_2 \left[ f\left(k'_{21}\frac{R}{R_n} + k'_{22}\frac{G}{G_n}\right) - f\left(\frac{B}{B_n}\right) \right].$$

-continued

Let $p_1 = f^{-1}\left(\frac{16+L^+}{116}\right) = v_{y_1}\frac{R}{R_n} + v_{y_2}\frac{G}{G_n} + v_{y_3}\frac{B}{B_n}$.

From the equation above, Equation (25) below may be obtained:

$$\frac{R}{R_n} = \frac{1}{v_{y_1}}\left(p_1 - v_{y_2}\frac{G}{G_n} - v_{y_3}\frac{B}{B_n}\right),$$

Let $p_2 = f^{-1}\left(f\left(\frac{G}{G_n}\right) + \frac{a^+}{s_1}\right) - k'_{11}\frac{R}{R_n} + k'_{13}\frac{B}{B_n}$.

From the equation above, if $$\frac{R}{R_n}$$

is replaced by Equation (25), Equation (26) below may be obtained:

$$\frac{B}{B_n} = \frac{v_{y_1}}{k'_{11}v_{y_3} - v_{y_1}k'_{13}}\left(\frac{k'_{11}}{v_{y_1}}p_1 - \frac{k'_{11}v_{y_2}}{v_{y_1}}\frac{G}{G_n} - p_2\right)$$

$$= c_1 p_1 + c_2 \frac{G}{G_n} + c_3 p_2$$

$$= c,$$

where $c_1 = \frac{k'_{11}}{k'_{11}v_{y_3} - v_{y_1}k'_{13}}$, $c_2 = -\frac{k'_{11}v_{y_2}}{k'_{11}v_{y_3} - v_{y_1}k'_{13}}$, and $c_3 = -\frac{v_{y_1}}{k'_{11}v_{y_3} - v_{y_1}k'_{13}}$, and $f^{-1}\left(f\left(\frac{B}{B_n}\right) + \frac{b^+}{s_2}\right)\frac{k'_{21}}{v_{y_1}}\left(p_1 - v_{y_2}\frac{G}{G_n} - v_{y_3}\frac{B}{B_n}\right) + k'_{22}\frac{G}{G_n}$.

From the equation above, if $$\frac{B}{B_n}$$

is replaced by Equation (26), Equation (27) below may be obtained:

$$f^{-1}\left(f\left(\frac{B}{B_n}\right) + \frac{b^+}{s_2}\right) = \frac{k'_{21}}{v_{y_1}}p_1 - \frac{k'_{21}v_{y_2} - v_{y_1}k'_{22}}{v_{y_1}}\frac{G}{G_n} - \frac{k'_{21}v_{y_3}}{v_{y_1}}$$

$$\left(c_1 p_1 + c_2 \frac{G}{G_n} + c_3 p_2\right)$$

$$= d_1 p_1 + d_2 \frac{G}{G_n} + d_3 p_2$$

$$= d,$$

where $d_1 = \frac{-k'_{21}k'_{13}}{k'_{11}v_{y_3} - v_{y_1}k'_{13}}$, $d_2 = -\frac{k'_{21}v_{y_2} - v_{y_1}k'_{22}}{v_{y_1}} + \frac{k'_{21}v_{y_3}}{v_{y_1}}\frac{k'_{11}v_{y_2}}{k'_{11}v_{y_3} - v_{y_1}k'_{13}}$, and $d_3 = \frac{k'_{21}v_{y_3}}{k'_{11}v_{y_3} - v_{y_1}k'_{13}}$.

From the equation above, it can be seen that $$f\left(\frac{B}{B_n}\right) + \frac{b^+}{s_2} = f(d).$$

In addition, $$c = \frac{B}{B_n}, \text{ and } p_2 = f^{-1}\left(f\left(\frac{G}{G_n}\right) + \frac{a^+}{s_1}\right).$$

Therefore, Equation (28) below may be obtained:

$$f\left(c_1 p_1 + c_2 \frac{G}{G_n} + c_3 f^{-1}\left(f\left(\frac{G}{G_n}\right) + \frac{a^+}{s_1}\right)\right) -$$

$$f\left(d_1 p_1 + d_2 \frac{G}{G_n} + d_3 f^{-1}\left(f\left(\frac{G}{G_n}\right) + \frac{a^+}{s_1}\right)\right) + \frac{b^+}{s_2} = 0.$$

Since $c_1$, $c_2$, $c_3$, $d_1$, $d_2$, $d_3$, $s_1$ and $s_2$ are fixed for one sensor, and $a^+$, $b^+$, and $p_1$ are known when $L^+$, $a^+$ and $b^+$ are given, $$\frac{G}{G_n}$$

is the only variable in the equation. Therefore, it can be treated as $$h\left(\frac{G}{G_n}\right) = 0,$$

and be solved by iterative searching. After solving $$\frac{G}{G_n}, \frac{B}{B_n} \text{ and } \frac{R}{R_n}$$

can be solved from Equations (26) and (25).

Figure 6A:
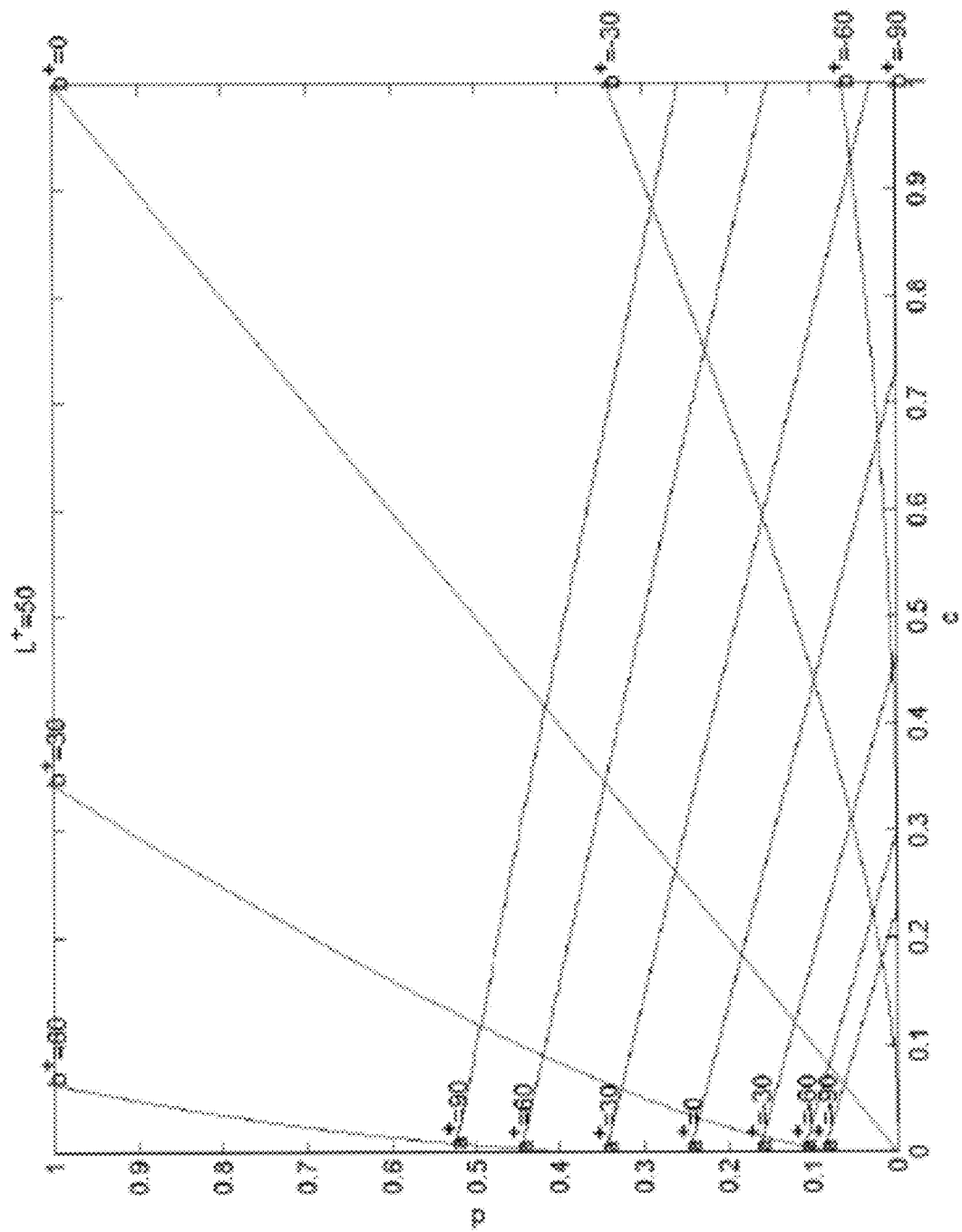
FIG. 6A and FIG. 6B are charts that together show the relation between c and d under different $L^+$, $a^+$, and $b^+$ for a third camera (linear sRGB).
Figure 6B:
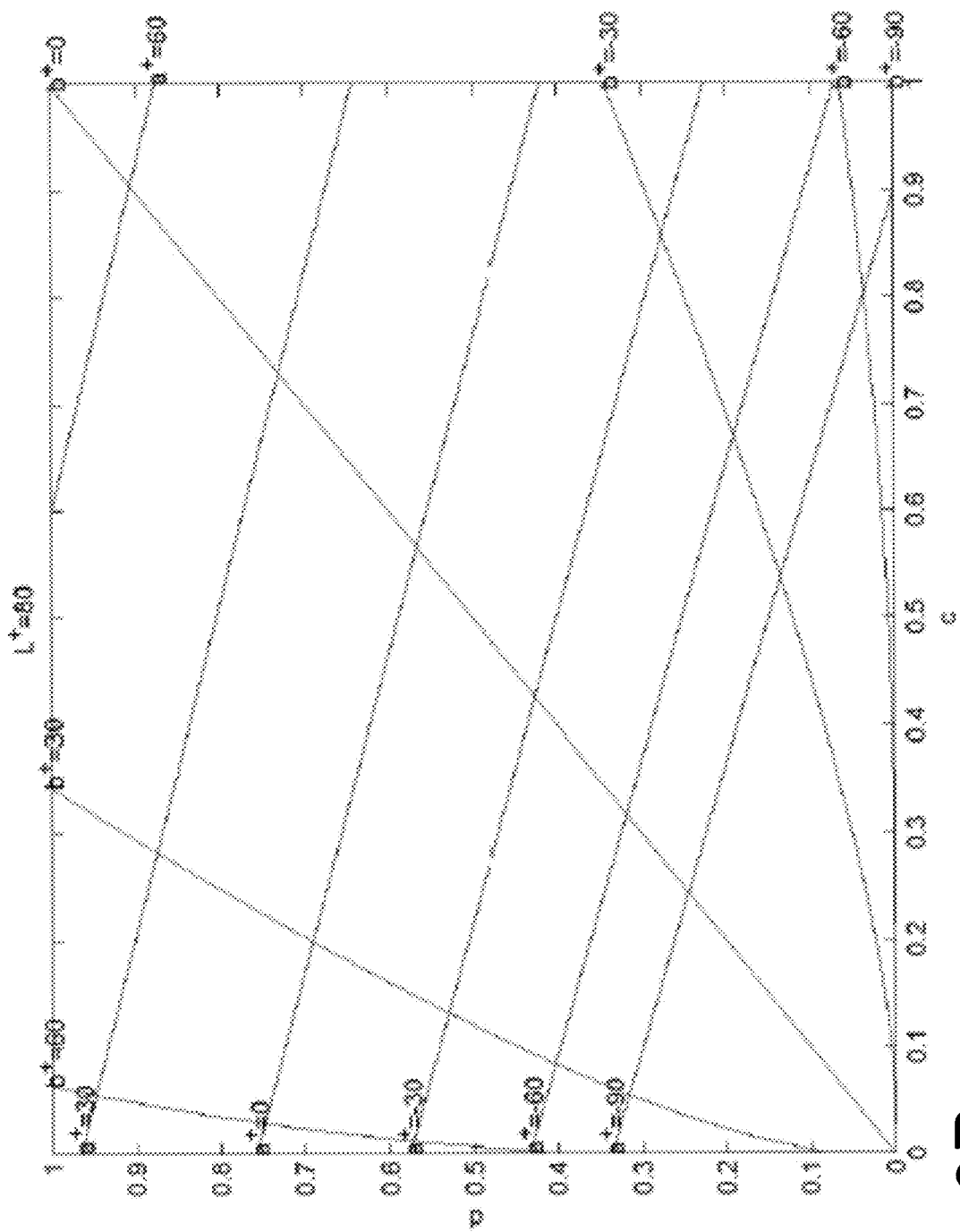

Charts 610 and 620 of FIG. 6A and FIG. 6B together show the relation between c and d under different $L^+$, $a^+$ and $b^+$ for a third camera (linear sRGB).

Since it is time-consuming to use the iterative method to solve $$\frac{G}{G_n},$$

a linear approximation may be used to solve inverse DLAB. The relation between c and d under different $L^+$, $a^+$, and $b^+$ for the third camera (a consumer camera and herein referred to as Camera C). When $b^+$ is fixed, $$d = f^{-1}\left(f\left(\frac{G}{G_n}\right) + \frac{b^+}{s_2}\right).$$

When $a^+$ and $L^+$ are fixed, and $$\frac{G}{G_n}$$

is given, $$c = c_1 p_1 + c_2 \frac{G}{G_n} + c_3 f^{-1}\left(f\left(\frac{G}{G_n}\right) + \frac{a^+}{s_1}\right), \text{ and}$$

$$d = d_1 p_1 + d_2 \frac{G}{G_n} + d_3 f^{-1}\left(f\left(\frac{G}{G_n}\right) + \frac{a^+}{s_1}\right)$$

can be computed. The inventors discovered that, for fixed $a^+$ and $L^+$, the relation between c and d is close to linear. Therefore, d can be approximated from c, and can be expressed as Equation (29) below:

$$d \approx m_{cd} c + q_{cd},$$

where $m_{cd}$ is the slope and $q_{cd}$ is the intercept. Two points $(c_a, d_a)$ and $(c_b, d_b)$ may be chosen to estimate the slope and intercept. When $G_a$ is given, $$c_a = c_1 p_1 + c_2 \frac{G_a}{G_n} + c_3 f^{-1}\left(f\left(\frac{G_a}{G_n}\right) + \frac{a^+}{s_1}\right) \text{ and}$$

$$d_a = d_1 p_1 + d_2 \frac{G_a}{G_n} + d_3 f^{-1}\left(f\left(\frac{G_a}{G_n}\right) + \frac{a^+}{s_1}\right).$$

When $G_b$ is given, $$c_b = c_1 p_1 + c_2 \frac{G_b}{G_n} + c_3 f^{-1}\left(f\left(\frac{G_b}{G_n}\right) + \frac{a^+}{s_1}\right) \text{ and}$$

$$d_b = d_1 p_1 + d_2 \frac{G_b}{G_n} + d_3 f^{-1}\left(f\left(\frac{G_b}{G_n}\right) + \frac{a^+}{s_1}\right).$$

Since d is approximated from c and from Equations (26) and (27), Equation (30) below may be obtained:

$$m_{cd} c + q_{cd} = m_{cd} \frac{B}{B_n} + q_{cd} \approx d = f^{-1}\left(f\left(\frac{B}{B_n}\right) + \frac{b^+}{s_2}\right).$$

There are four cases for solving $$m_{cd} \frac{B}{B_n} + q_{cd} = f^{-1}\left(f\left(\frac{B}{B_n}\right) + \frac{b^+}{s_2}\right)$$

to obtain $$\frac{B}{B_n}.$$

These four cases are described below.
When $$\frac{B}{B_n} \geq \left(\frac{24}{116}\right)^3 \text{ and } \left(\frac{B}{B_n}\right)^{\frac{1}{3}} + \frac{b^+}{s_2} \geq \frac{24}{116},$$

herein referred to as Case I, Equation (30) can be expressed as Equation (31) below:

$$(1 - m_{cd})\frac{B}{B_n} + 3\frac{b^+}{s_2}\left(\frac{B}{B_n}\right)^{\frac{2}{3}} + 3\left(\frac{b^+}{s_2}\right)^2\left(\frac{B}{B_n}\right)^{\frac{1}{3}} + \left(\frac{b^+}{s_2}\right)^3 - q_{cd} = 0.$$

When $$\frac{B}{B_n} < \left(\frac{24}{116}\right)^3 \text{ and } \frac{841}{108}\frac{B}{B_n} + \frac{b^+}{s_2} \geq \frac{8}{116},$$

herein referred to as Case II, Equation (30) can be expressed as Equation (32) below:

$$\left(\frac{841}{108}\right)^3\left(\frac{B}{B_n}\right)^3 + 3\left(\frac{841}{108}\right)^2\left(\frac{16}{116} + \frac{b^+}{s_2}\right)\left(\frac{B}{B_n}\right)^2 +$$

$$\left[3\left(\frac{841}{108}\right)\left(\frac{16}{116} + \frac{b^+}{s_2}\right)^2 - m_{cd}\right]\frac{B}{B_n} + \left(\frac{16}{116} + \frac{b^+}{s_2}\right)^3 - q_{cd} = 0.$$

When $$\frac{B}{B_n} \geq \left(\frac{24}{116}\right)^3 \text{ and } \left(\frac{B}{B_n}\right)^{\frac{1}{3}} + \frac{b^+}{s_2} < \frac{24}{116},$$

herein referred to as Case III, Equation (30) can be expressed as Equation (33) below:

$$-m_{cd}\frac{B}{B_n} + \frac{108}{841}\left(\frac{B}{B_n}\right)^{\frac{1}{3}} + \frac{108}{841}\left(\frac{b^+}{s_2} - \frac{16}{116}\right) - q_{cd} = 0.$$

When $$\frac{B}{B_n} < \left(\frac{24}{116}\right)^3 \text{ and } \frac{841}{108}\frac{B}{B_n} + \frac{b^+}{s_2} < \frac{8}{116},$$

herein referred to as Case IV, $$\frac{B}{B_n}$$

can be solved by Equation (34) below:

$$\frac{B}{B_n} = \frac{\frac{108}{841}\frac{b^+}{s_2} - q_{cd}}{m_{cd} - 1}.$$

Cases I, II, and III are cubic equations. The real root of the cubic equations can be found by Cardano's method.

Let $$x = t - \frac{\beta}{3\alpha}$$

for the cubic equation $\alpha x^3+\beta x^2+\gamma x+\delta=0$. The cubic equation can be re-written as Equation (35) below:

$$t^3 + \left(\frac{\gamma}{\alpha} - \frac{\beta^2}{3\alpha^2}\right)t + \frac{2}{27}\left(\frac{\beta}{\alpha}\right)^3 - \frac{\beta\gamma}{3\alpha^2} + \frac{\delta}{\alpha} = t^3 + kt + \rho = 0.$$

Let t=u+v, the equation can be written as $(u+v)^3+\kappa(u+v)+\rho=0$. By expanding the equation, the following expression can be obtained: $u^3+v^3+\rho+(u+v)(3uv+\kappa)=0$. When $3uv+\kappa=0$ and $u^3+v^3+\rho=0$, the solution for the equation can be found. In this case, $u^3+v^3=-\rho$ and $$u^3 v^3 = -\frac{k^3}{27}.$$

Therefore, $u^3$ and $v^3$ are the roots of $$X^2 + \rho X - \frac{k^3}{27} = 0.$$

Thus, Equations (36) and (37) below are obtained:

$$u = \sqrt[3]{-\frac{\rho}{2} + \sqrt{\frac{\rho^2}{4} + \frac{\kappa^3}{27}}},$$

$$v = \sqrt[3]{-\frac{\rho}{2} - \sqrt{\frac{\rho^2}{4} + \frac{\kappa^3}{27}}}.$$

The real root for x is expressed as Equation (38) below:

$$x = u + v - \frac{\beta}{3\alpha}.$$

One solution of these four cases matches the condition, which is the solution for $$\frac{B}{B_n}.$$

in order to solve $$\frac{G}{G_n}$$

from $$\frac{B}{B_n},$$

let Equation (39) below stand:

$$p_3 - f^{-1}\left(f\left(\frac{B}{B_n}\right) + \frac{b^+}{s_2}\right) - k'_{21}\frac{R}{R_n} + k'_{22}\frac{G}{G_n}.$$

From Equation (39) above, if $$\frac{R}{R_n}$$

is replaced by Equation (25), Equation (40) below can be obtained:

$$\frac{G}{G_n} = \frac{v_{y_1}}{k'_{21}v_{y_0} - v_{y_1}k'_{22}}\left(\frac{k'_{21}}{v_{y_1}}p_1 - \frac{k'_{21}v_{y_3}}{v_{y_1}}\frac{B}{B_n} - p_3\right).$$

After solving $$\frac{G}{G_n}, \frac{R}{R_n}$$

can be solved from Equation (25).

Example Implementations

Figure 7:
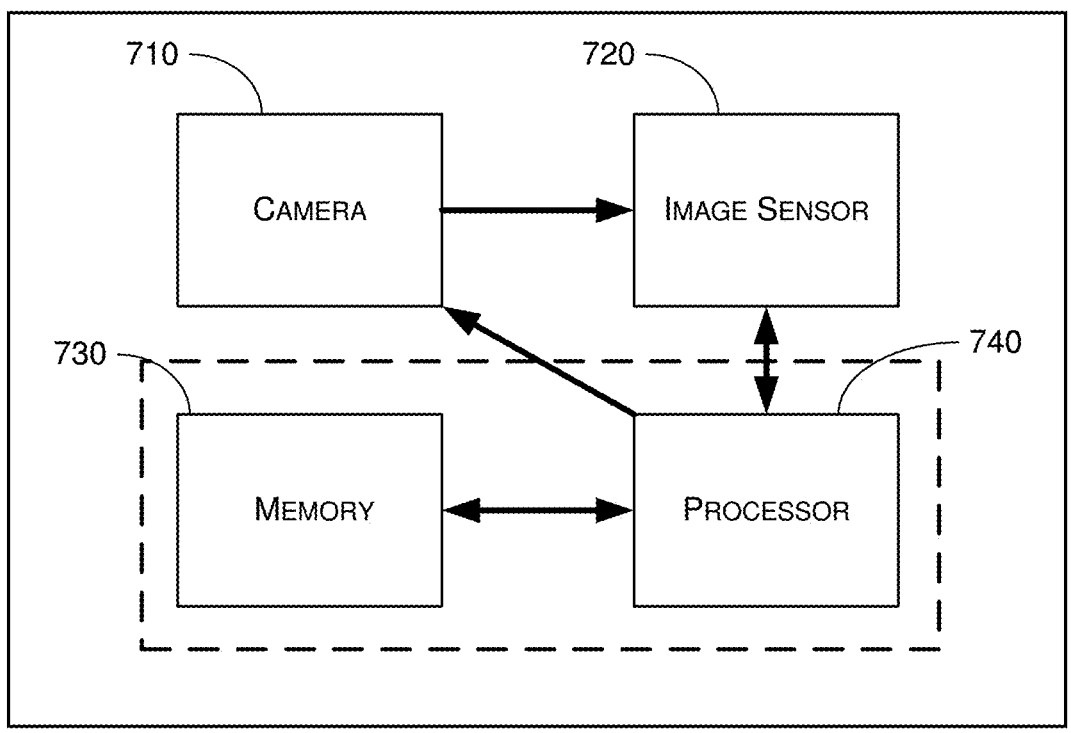
FIG. 7 is a block diagram of an example apparatus in accordance with embodiments of the present disclosure.

FIG. 7 is a block diagram of an example apparatus 700 configured to implement techniques, methods and systems in accordance with embodiments of the present disclosure.

Example apparatus 700 may perform various functions related to techniques, methods and systems described herein. In some embodiments, example apparatus 700 may be a portable electronics apparatus such as, for example, a smartphone, a personal digital assistant (PDA) or a portable computing device such as a tablet computer, a laptop computer, a notebook computer and the like, which is equipped with an imaging device.

In some embodiments, example apparatus 700 may include at least those components enclosed in the solid line of FIG. 7, such as a camera 710, an image sensor 720, a memory 730 and a processor 740. Although image sensor 720, memory 730 and processor 740 are illustrated as discrete components separate from each other, in various embodiments some or all of camera 710, image sensor 720, memory 730 and processor 740 may be integral parts of a single module with integrated circuit (IC), chip or chipset. Moreover, camera 710 and image sensor 720 may be integral parts of a single module with IC, chip or chipset. Each of image sensor 720, memory 730 and processor 740 may be implemented in the form of a physical circuit (and optional firmware, middleware, software, or any combination thereof) configured to perform the respective function(s) described herein.

In some other embodiments, example apparatus 700 may be, for example, an module with IC, chip, chipset or an assembly of one or more chips and a printed circuit board (PCB), which may be implementable in a portable electronics apparatus such as, for example, a smartphone, a PDA or a portable computing device such as a tablet computer, a laptop computer, a notebook computer and the like, which is equipped with an imaging device. In such case, example apparatus 700 may include at least those components enclosed in the dashed line of FIG. 7, such as memory 730 and processor 740. Although memory 730 is illustrated as discrete components separate from processor 740, in various embodiments, memory 730 and processor 740 may be integral parts of an IC, chip or chipset.

Camera 710 may be an optical instrument and configured to capture images, which may be still photographs and/or moving images such as video.

Image sensor 720 may be configured to sense the images captured by camera 710 and convert the sensed image to corresponding electrical data that can be stored in memory 730. Image sensor 720 may be a charge-coupled device (CCD) or an active-pixel sensor, e.g., CMOS sensor. In the present disclosure, image sensor 720 alone or both the image sensor 720 and camera 710 may be considered as an imaging device.

Memory 730 may be configured to store data, e.g., image data, and/or one or more sets of processor-executable instructions. The one or more sets of processor-executable instructions may be firmware, middleware, software or any combination thereof. Memory 730 may be in the form of any combination of one or more computer-usable or non-transitory computer-readable media. For example, memory 730 may be in the form of one or more of a removable computer diskette, a hard disk, a random access memory (RAM) device, a read-only memory (ROM) device, an erasable programmable read-only memory (EPROM or Flash memory) device, a removable compact disc read-only memory (CDROM), an optical storage device, a magnetic storage device, or any suitable storage device. Computer program code for carrying out operations of the present disclosure may be written in any combination of one or more programming languages. Such code, or processor-executable instruction, may be compiled from source code to computer-readable assembly language or machine code suitable for the device or computer on which the code will be executed.

Processor 740 may be an image signal processor, image processor, media processor, digital signal processor, graphics processor or the like. Processor 740 may be coupled to camera 710, image sensor 720 and memory 730 for communication, data access, control, etc. For example, there may be communication from processor 740 to image sensor 720 to better interpret the image captured by camera 710. There may also be communication between image sensor 720 and memory 730 by way of and/or under the control of processor 740. Image sensor 720 may also communicate to processor 740 to improve rendering of the captured image. Processor 740 may also communicate to camera 710 to adjust one or more parameters of camera 710 such as, for example, focus of lens of camera 710, zooming in and out of the lens of camera 710, etc. Processor 740 may store data, e.g., image data, in memory 730 and retrieve data and/or instructions or code from memory 730. Processor 740 may execute the one or more sets of instructions stored in memory 730.

Processor 740 may be configured to construct a uniform color space, or DLAB, from raw tristimulus, or RGB, values of an imaging device, e.g., image sensor 720 or both the image sensor 720 and camera 710. The techniques described above with respect to Equations (1)-(21) may be utilized by processor 740 in performing these operations. For example, processor 740 may execute the one or more sets of instructions stored in memory 730 to obtain, receive, retrieve, access or otherwise determine characteristics related to the imaging device, and determine a direction and a scale of each of first, second and third perceptual color axes based at least in part on the characteristics related to the imaging device. The first perceptual color axis may correlate with lightness, the second perceptual color axis may correlate with yellow-blue color variations, and the third perceptual color axis may correlate with red-green color variations. The second perceptual color axis may be substantially aligned with the daylight variation.

When spectral sensitivity functions of the imaging device are known, in obtaining the characteristics related to the imaging device, processor 740 may be configured to receive parameters associated with spectral sensitivity functions of the imaging device. For example, a vendor of processor 740 may have the parameters associated with spectral sensitivity functions of one or more imaging devices, and may store such coefficients in memory 730 for processor 740 to access. Such parameters may be, for example, those pre-computed coefficients shown in logic 200 of FIG. 2.

When spectral sensitivity functions of the imaging device are unknown, in obtaining the characteristics related to the imaging device, processor 740 may use a color checker with a plurality of color patches with known Munsell color notations or known spectral reflectances. Processor 740 may also receive a plurality of images of the color checker captured under different phases of daylight by the imaging device. For example, a user of a portable electronics apparatus equipped with an imaging device and processor 740 can take a number of images of a color target, and DLAB can be constructed based on these images, e.g., by least square fitting using techniques described below regarding FIG. 5.

In at least some embodiments, the plurality of color patches may include a series of patches of neutral colors.

In at least some embodiments, in determining the direction and the scale of each of the first, second and third perceptual color axes based at least in part on characteristics related to the imaging device, processor 740 may compute a daylight plane of the imaging device, a best-fitting constant lightness plane of Munsell colors with the constant lightness plane having a surface normal vector as the first perceptual color axis, and an intersection line of the daylight plane and the constant lightness plane as the second perceptual color axis based at least in part on the characteristics related to the imaging device. Processor 740 may also determine a first line as the third perceptual color axis, the first line being on the constant lightness plane and also orthogonal to the second perceptual color axis. Processor 740 may further scale the first perceptual color axis, the second perceptual color axis, and the third perceptual color axis so that a resulting distance in the uniform color space and a distance of Munsell colors in a CIELAB color space are substantially the same.

In at least some embodiments, the second perceptual color axis may be the yellow-blue axis and the third perceptual color axis may be orthogonal to the second perceptual color axis. Alternatively, the third perceptual color axis may be an axis of a predefined color correlated with the perceptual red-green axis, e.g., an axis of the color of foliage.

In at least some embodiments, in scaling the first perceptual color axis, the second perceptual color axis, and the third perceptual color axis, processor 740 may scale the first perceptual color axis, the second perceptual color axis, and the third perceptual color axis with weighted errors so that one or more chosen colors are weighted more heavily relative to other colors to emphasize a fidelity of the one or more chosen colors as represented in the uniform color space.

In at least some embodiments, processor 740 may also be configured to perform operations to compute an inverse transform of a uniform color space having a perceptual color axis substantially aligned with the daylight variation. The techniques described above with respect to Equations (22)-(40) may be utilized by processor 740 in performing these operations. For example, processor 740 may reduce a plurality of equations describing the uniform color space into a nonlinear equation with a single variable. Processor 740 may examine a behavior of the nonlinear equation for a plurality of input ranges to determine a proper projection for linear approximation. Processor 740 may also solve one or more combinational cases of a third-degree polynomial and a first-degree polynomial from the linear approximation in the projection to provide a solution. For example, processor 740 may solve Equations (31)-(34) for cases I, II, III and IV as described above to arrive at a solution. For example, processor 740 may determine if the solution of $$\frac{B}{B_n}$$

is located between the range for the case. For the $$\frac{B}{B_n}$$

calculated from Equation (31), processor 740 may determine if $$\frac{B}{B_n}$$

is greater than or equal to the value of $$\left(\frac{24}{116}\right)^3 \text{ and if } \left(\frac{B}{B_n}\right)^{\frac{2}{3}} + \frac{b^+}{s_2}$$

is greater than or equal to the value of 24/116. If the result of the determination is positive (i.e., $$\frac{B}{B_n}$$

is greater than or equal to the value of $$\left(\frac{24}{116}\right)^3 \text{ and } \left(\frac{B}{B_n}\right)^{\frac{2}{3}} + \frac{b^+}{s_2}$$

is greater than or equal to the value of 24/116), then $$\frac{B}{B_n}$$

calculated from Equation (31) is the solution. If not, processor 740 may determine whether the solution of $$\frac{B}{B_n}$$

from Equations (32)-(34) is in the range or not.

Processor 740 may further determine whether the solution is within a color gamut of the imaging device. In addition, processor 740 may map an out-of-gamut solution into an in-gamut color according to a gamut mapping strategy. For example, processor 740 may preserve hue information by scaling without clipping, e.g., by fixing the ratio of $a^+$ and $b^+$ as in $[L^+ \ a^+ \ b^+] \Rightarrow [L^+ \ ra^+ \ rb^+]$ where r is the maximal scaling factor that will bring all color channels within valid range.

Figure 8:
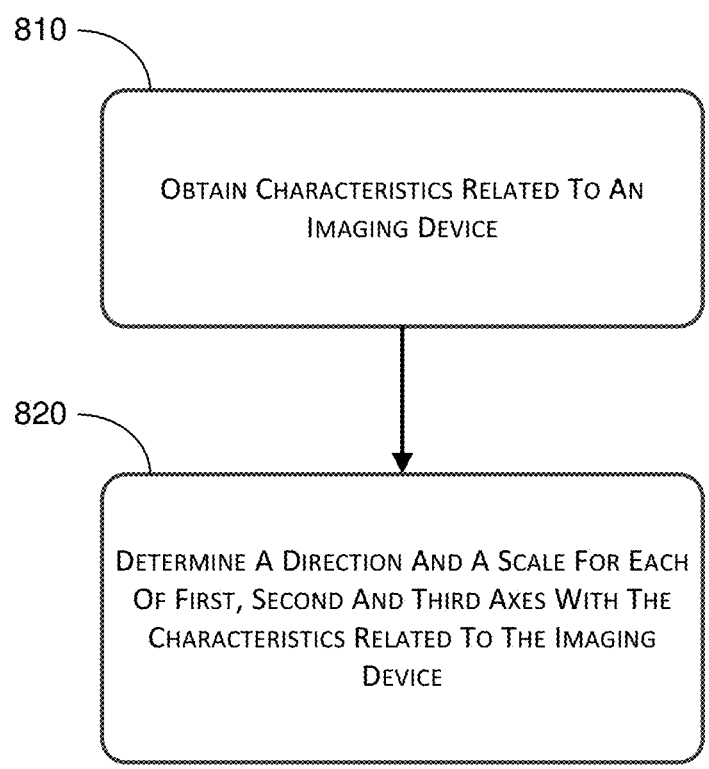
FIG. 8 is a flowchart of an example process related to constructing a uniform color space from raw tristimulus values of an imaging device in accordance with an embodiment of the present disclosure.

FIG. 8 is a flowchart of an example process 800 related to constructing a uniform color space from raw tristimulus values of an imaging device in accordance with an embodiment of the present disclosure.

Example process 800 may include one or more operations, actions, or functions as illustrated by one or more of blocks 810 and 820. Although illustrated as discrete blocks, various blocks may be divided into additional blocks, combined into fewer blocks, or eliminated, depending on the desired implementation. Example process 800 may be implemented by processor 740 of example apparatus 700. For illustrative purposes, the operations described below are performed by processor 740 of example apparatus 700. The techniques described above with respect to Equations (1)-(21) may be utilized by processor 740, or any other suitable one or more processors, in performing operations pertaining to blocks 810 and 820 of example process 800. Example process 800 may begin at block 810.

Block 810 (Obtain Characteristics Related To An Imaging Device) may refer to processor 740 obtaining, receiving, retrieving, accessing or otherwise determining characteristics related to the imaging device. Block 810 may be followed by block 820.

Block 820 (Determine A Direction And A Scale For Each Of First, Second And Third Axes With The Characteristics Related To The Imaging Device) may refer to processor 740 determining a direction and a scale of each of first, second and third perceptual color axes based at least in part on the characteristics related to the imaging device. As a result, the first perceptual color axis may correlate with lightness, the second perceptual color axis may correlate with yellow-blue color variations, and the third perceptual color axis may correlate with red-green color variations. Additionally, the second perceptual color axis may be substantially aligned with the daylight variation.

In at least some embodiments, in obtaining the characteristics related to the imaging device, example process 800 may involve the processor 740 receiving parameters associated with spectral sensitivity functions of the imaging device.

Alternatively, in obtaining the characteristics related to the imaging device, example process 800 may involve the processor 740 performing operations including: using a color checker with a plurality of color patches with known Munsell color notations or known spectral reflectances; and receiving a plurality of images of the color checker captured under different phases of daylight by the imaging device. In at least some embodiments, the plurality of color patches may include a series of patches of neutral colors.

In at least some embodiments, in determining the direction and the scale of each of the first, second and third perceptual color axes based at least in part on characteristics related to the imaging device, example process 800 may involve the processor 740 performing operations including: computing a daylight plane of the imaging device, a best-fitting constant lightness plane of Munsell colors with the constant lightness plane having a surface normal vector as the first perceptual color axis, and an intersection line of the daylight plane and the constant lightness plane as the second perceptual color axis based at least in part on the characteristics related to the imaging device; determining a first line as the third perceptual color axis, the first line being on the constant lightness plane and also orthogonal to a second perceptual color axis; and scaling the first perceptual color axis, the second perceptual color axis, and the third perceptual color axis so that a resulting distance in the uniform color space and a distance of Munsell colors in a CIELAB color space are substantially the same.

In at least some embodiments, the second perceptual color axis may be the yellow-blue axis, e.g., daylight, and the third perceptual color axis may be orthogonal to the second perceptual color axis. Alternatively, the third perceptual color axis may be an axis of a predefined color correlated with the perceptual red-green axis, e.g., an axis of the color of foliage. That is, example process 800 may find other colors such as foliage, for example, to align with the red-green axis. Such colors need not be orthogonal to the yellow-blue axis.

In at least some embodiments, in scaling the first perceptual color axis, the second perceptual color axis, and the third perceptual color axis, example process 800 may involve the processor 740 scaling the first perceptual color axis, the second perceptual color axis, and the third perceptual color axis with weighted errors so that one or more chosen colors are weighted more heavily relative to other colors to emphasize a fidelity of the one or more chosen colors as represented in the uniform color space.

In at least some embodiments, example process 800 may involve the processor 740 performing additional operations including: reducing a plurality of equations describing the uniform color space into a nonlinear equation with a single variable; examining a behavior of the nonlinear equation for a plurality of input ranges to determine a best projection for linear approximation; solving one or more combinational cases of a third-degree polynomial and a first-degree polynomial from the linear approximation in the projection to provide a solution; determining whether the solution is within a color gamut of the imaging device; and mapping an out-of-gamut solution into an in-gamut color according to a gamut mapping strategy.

Figure 9:
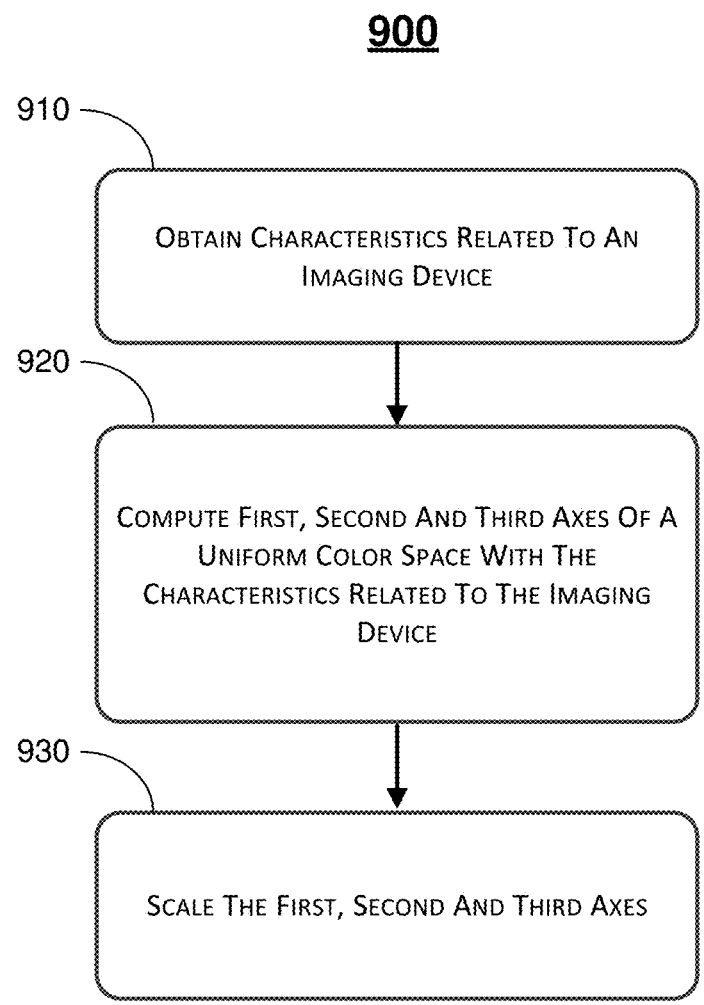
FIG. 9 is a flowchart of an example process related to constructing a uniform color space from raw tristimulus values of an imaging device in accordance with another embodiment of the present disclosure.

FIG. 9 is a flowchart of an example process 900 related to constructing a uniform color space from raw tristimulus values of an imaging device in accordance with another embodiment of the present disclosure.

Example process 900 may include one or more operations, actions, or functions as illustrated by one or more of blocks 910, 920 and 930. Although illustrated as discrete blocks, various blocks may be divided into additional blocks, combined into fewer blocks, or eliminated, depending on the desired implementation. Example process 900 may be implemented by processor 740 of example apparatus 700. For illustrative purposes, the operations described below are performed by processor 740 of example apparatus 700. The techniques described above with respect to Equations (1)-(21) may be utilized by processor 740, or any other suitable one or more processors, in performing operations pertaining to blocks 910, 920 and 930 of example process 900. Example process 900 may begin at block 910.

Block 910 (Obtain Characteristics Related To An Imaging Device) may refer to processor 740 obtaining, receiving, retrieving, accessing or otherwise determining characteristics related to the imaging device. Block 910 may be followed by block 920.

Block 920 (Compute First, Second And Third Axes Of A Uniform Color Space With The Characteristics Related To The Imaging Device) may refer to processor 740 computing first, second and third perceptual color axes. The first perceptual color axis may be correlated with lightness. The second perceptual color axis may be correlated with a first color variations and substantially aligned with the daylight variation. The third perceptual color axis may be correlated with a second color variation and orthogonal to the second perceptual color axis. Block 920 may be followed by block 930.

Block 930 (Scale The First, Second And Third Axes) may refer to processor 740 scaling the first, second and third perceptual color axes so that a resulting distance in the uniform color space and a distance of Munsell colors in a CIELAB color space are substantially the same.

In at least some embodiments, in obtaining characteristics related to the imaging device, example process 900 may involve the processor 740 receiving parameters associated with spectral sensitivity functions of the imaging device.

Alternatively, in obtaining characteristics related to the imaging device, example process 900 may involve the processor 740 using a color checker with a plurality of color patches with known Munsell color notations or known spectral reflectances. Additionally, example process 900 may also involve the processor 740 receiving a plurality of images of the color checker captured under different phases of daylight by the imaging device. In at least some embodiments, the plurality of color patches may include a series of patches of neutral colors.

In at least some embodiments, in computing first, second and third perceptual color axes, example process 900 may involve the processor 740 computing a daylight plane of the imaging device, a constant lightness plane of Munsell colors with the constant lightness plane having a surface normal vector as the first perceptual color axis, and an intersection line of the daylight plane and the constant lightness plane as the second perceptual color axis based at least in part on the characteristics related to the imaging device. Additionally, example process 900 may also involve the processor 740 determining a first line as the third perceptual color axis, with the first line on the constant lightness plane and orthogonal to the second perceptual color axis.

In at least some embodiments, the second perceptual color axis may be a yellow-blue axis, e.g., daylight, and the third perceptual color axis may be orthogonal to the second perceptual color axis. Alternatively, the third perceptual color axis may be an axis of a color correlated with the perceptual red-green axis, e.g., an axis of the color of foliage. That is, example process 900 may find other colors such as foliage, for example, to align with the red-green axis. Such colors need not be orthogonal to the yellow-blue axis.

In at least some embodiments, in scaling, example process 900 may involve the processor 740 scaling with weighted errors so that one or more chosen colors are weighted more heavily relative to other colors to emphasize a fidelity of the one or more chosen colors as represented in the uniform color space. In at least some embodiments, the one or more chosen colors may include at least a color of skin, grass, blue sky, or any other user-chosen color.

Figure 10:
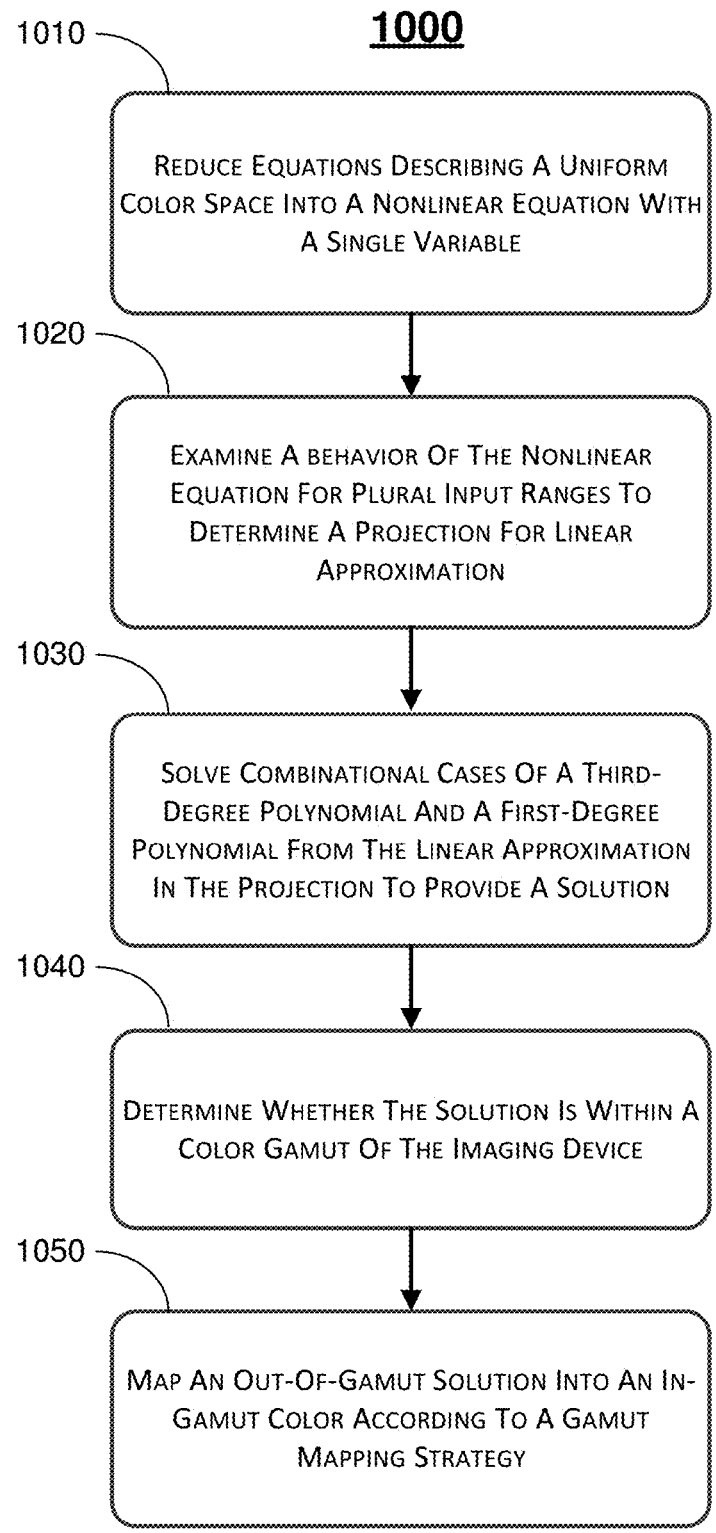
FIG. 10 is a flowchart of an example process related to computing an inverse transform of a uniform color space having a perceptual color axis substantially aligned with the daylight variation in accordance with an embodiment of the present disclosure.

FIG. 10 is a flowchart of an example process 1000 related to computing an inverse transform of a uniform color space having a perceptual color axis substantially aligned with the daylight variation in accordance with an embodiment of the present disclosure.

Example process 1000 may include one or more operations, actions, or functions as illustrated by one or more of blocks 1010, 1020, 1030, 1040 and 1050. Although illustrated as discrete blocks, various blocks may be divided into additional blocks, combined into fewer blocks, or eliminated, depending on the desired implementation. Example process 1000 may be implemented by processor 740 of example apparatus 700. For illustrative purposes, the operations described below are performed by processor 740 of example apparatus 700. The techniques described above with respect to Equations (22)-(40) may be utilized by processor 740, or any other suitable one or more processors, in performing operations pertaining to blocks 1010, 1020, 1030, 1040 and 1050 of example process 1000. Example process 1000 may begin at block 1010.

Block 1010 (Reduce Equations Describing A Uniform Color Space Into A Nonlinear Equation With A Single Variable) may refer to processor 740 reducing a plurality of equations describing the uniform color space into a nonlinear equation with a single variable. Block 1010 may be followed by block 1020.

Block 1020 (Examine A Behavior Of The Nonlinear Equation For Plural Input Ranges To Determine A Projection For Linear Approximation) may refer to processor 740 examining a behavior of the nonlinear equation for a plurality of input ranges to determine a best projection for linear approximation. Block 1020 may be followed by block 1030.

Block 1030 (Solve Combinational Cases Of A Third-Degree Polynomial And A First-Degree Polynomial From The Linear Approximation In The Projection To Provide A Solution) may refer to processor 740 solving one or more combinational cases of a third-degree polynomial and a first-degree polynomial from the linear approximation in the projection to provide a solution. Block 1030 may be followed by block 1040.

Block 1040 (Determine Whether The Solution Is Within A Color Gamut Of The Imaging Device) may refer to processor 740 determining whether the solution is within a color gamut of the imaging device. Block 1040 may be followed by block 1050.

Block 1050 (Map An Out-Of-Gamut Solution Into An In-Gamut Color According To A Gamut Mapping Strategy) may refer to processor 740 mapping an out-of-gamut solution into an in-gamut color according to a gamut mapping strategy.

Figure 11:
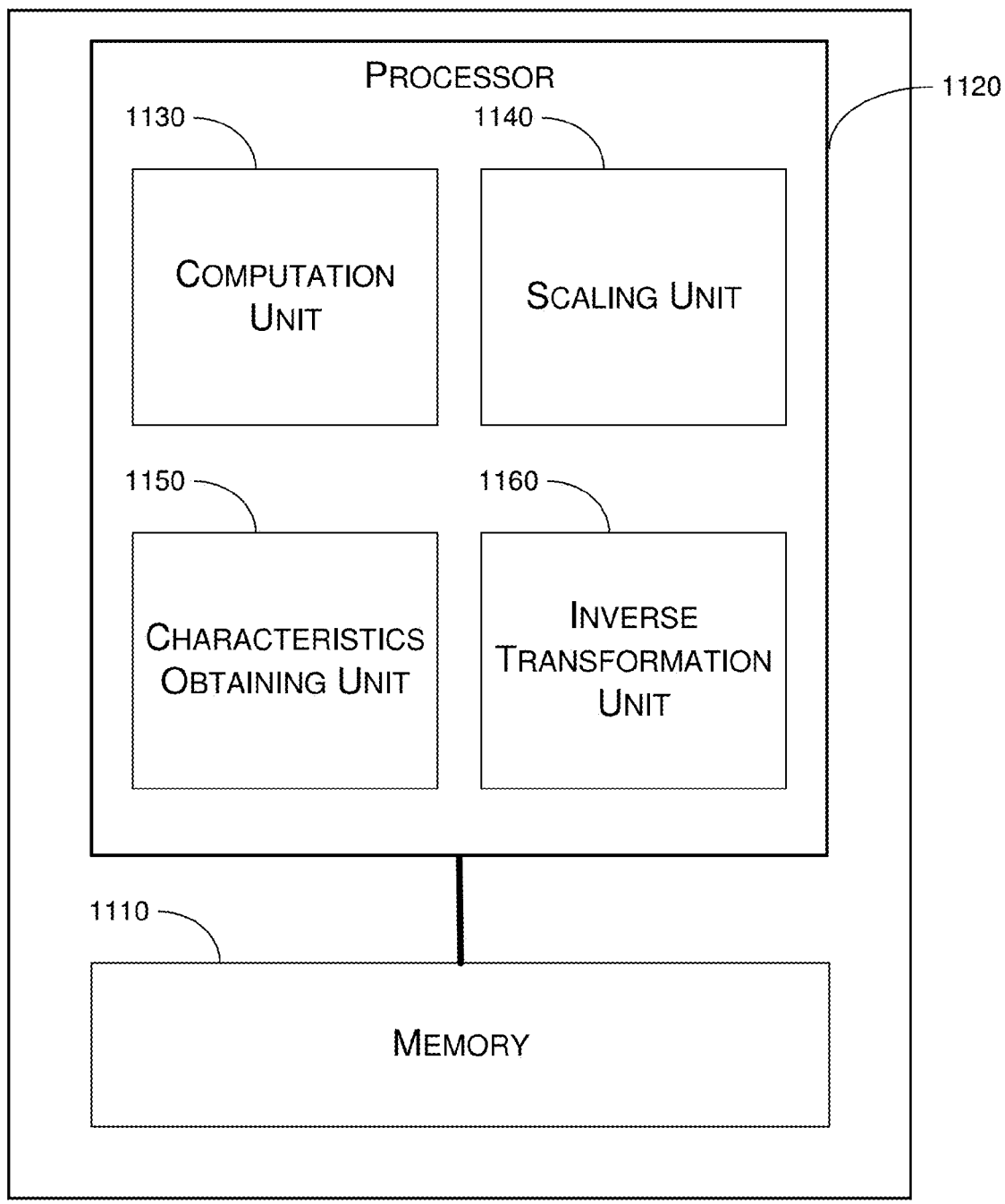
FIG. 11 is a block diagram of an example device in accordance with embodiments of the present disclosure.

FIG. 11 is a block diagram of an example device 1100 configured to implement techniques, methods and systems in accordance with embodiments of the present disclosure.

In some embodiments, example device 1100 may be, for example, an IC, chip, chipset or an assembly of one or more chips and a PCB, which may be implementable in an imaging device such as a camera. In some other embodiments, example device 1100 may be, for example, an IC, chip, chipset or an assembly of one or more chips and a PCB, which may be implementable in a portable electronics apparatus such as, for example, a smartphone, a personal digital assistant (PDA) or a portable computing device such as a tablet computer, a laptop computer, a notebook computer and the like, where such a portable electronics apparatus is equipped with an imaging device.

Example device 1100 may include a memory 1110 and a processor 1120.

Memory 1110 may be configured to store data representative of characteristics related to an imaging device in which example device 1100 may be implemented. For example, when characteristics related to the imaging device (e.g., spectral sensitivity functions of the imaging device) are known, data pertaining to the characteristics of the imaging device, such as coefficients of DLAB, may be pre-computed and stored in memory 1110 by a vendor.

Processor 1120 may be configured to store data in and access data from memory 1110. In some embodiments, processor 1120 alone or both processor 1120 and memory 1110 may be implemented as processor 740 of example apparatus 700 of FIG. 7.

Processor 1120 may include a computation unit 1130 and a scaling unit 1140. Optionally, processor 1120 may also include a characteristics obtaining unit 1150. Still optionally, processor 1120 may further include an inverse transformation unit 1160. Each of the computation unit 1130, scaling unit 1140, characteristics obtaining unit 1150 and inverse transformation unit 1160 may be implemented in the form of a physical circuit (and optional firmware, middleware, software, or any combination thereof) that is configured to perform the respective function(s) described herein. That is, example device 1100 is a special-purpose machine designed and configured to perform specific operations to achieve novel and non-obvious results in accordance with embodiments of the present disclosure.

Computation unit 1130 may be configured to compute first, second and third perceptual color axes of a uniform color space based at least in part on the characteristics related to the imaging device. Scaling unit 1140 may be configured to scale the first, second and third perceptual color axes so that a resulting distance in the uniform color space is substantially equal to a distance of Munsell colors in a CIELAB color space.

In at least some embodiments, the first perceptual color axis may correlate with lightness, the second perceptual color axis may correlate with yellow-blue color variations, and the third perceptual color axis may correlate with red-green color variations. The second perceptual color axis may be substantially aligned with a daylight variation.

In at least some embodiments, the characteristics related to the imaging device may include parameters associated with spectral sensitivity functions of the imaging device.

In at least some embodiments, in computing the first, second and third perceptual color axes of the uniform color space, computation unit 1130 may, based at least in part on the characteristics related to the imaging device, compute a daylight plane of the imaging device, a constant lightness plane of Munsell colors with the constant lightness plane having a surface normal vector as the first perceptual color axis, and an intersection line of the daylight plane and the constant lightness plane as the second perceptual color axis. Computation unit 1130 may also determine a first line as the third perceptual color axis, the first line on the constant lightness plane and orthogonal to the second perceptual color axis. In at least some embodiments, the second perceptual color axis may include a yellow-blue axis. In at least some embodiments, the third perceptual color axis may include an axis of a predefined color correlated with a perceptual red-green axis.

In at least some embodiments, in scaling the first, second and third perceptual color axes, scaling unit 1140 may be configured to scale the first, second and third perceptual color axes with weighted errors so that one or more chosen colors are weighted more heavily relative to other colors to emphasize a fidelity of the one or more chosen colors as represented in the uniform color space.

Characteristics obtaining unit 1150 may be configured to obtain the characteristics related to the imaging device by performing a number of operations. For example, when the characteristics related to the imaging device, e.g., spectral sensitivity functions, are unknown, images of a color target with known Munsell color notations or spectral reflectance functions, such as a Macbeth color checker or any other suitable color checker, may be taken by a user with the imaging device to obtain raw camera RGB values. In such case, a user of a portable electronics apparatus equipped with an imaging device in which example device 1100 is implemented can take a number of images of the color target. Based on these images, characteristics obtaining unit 1150 of example device 1100 may be able to construct DLAB, e.g., by least square fitting using techniques described below regarding FIG. 5.

Characteristics obtaining unit 1150 may use a color checker with a plurality of color patches with known Munsell color notations or known spectral reflectances. Characteristics obtaining unit 1150 may also receive a plurality of images of the color checker captured under different phases of daylight by the imaging device. In at least some embodiments, the plurality of color patches may include a series of patches of neutral colors.

Inverse transformation unit 1160 may be configured to compute an inverse transformation of the uniform color space. The techniques described above with respect to Equations (22)-(40) may be utilized by inverse transformation unit 1160 in computing the inverse transformation of the uniform color space. For example, inverse transformation unit 1160 may compute the inverse transformation of the uniform color space by performing operations including: reducing a plurality of equations describing the uniform color space into a nonlinear equation with a single variable; examining a behavior of the nonlinear equation for a plurality of input ranges to determine a projection for linear approximation; solving one or more combinational cases of a third-degree polynomial and a first-degree polynomial from the linear approximation in the projection to provide a solution; determining whether the solution is within a color gamut of the imaging device; and mapping an out-of-gamut solution into an in-gamut color according to a gamut mapping strategy.

In some embodiments, results of an inverse transformation of the uniform color space, or DLAB, may be computed offline in advance (e.g., not by or in processor 1120) for a plurality of grid points of the uniform color space. For example, memory 1110 may also be configured to store a lookup table containing a plurality of results of an inverse transformation of the uniform color space corresponding to a plurality of grid points of the uniform color space. Additionally, computation unit 1130 may be configured to interpolate one or more additional inverse colors in the uniform color space based at least in part on the lookup table. In this scenario inverse transformation unit 1160 may not be required in processor 1120.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
    obtaining, by a processor, characteristics related to an imaging device;
    constructing, by the processor, a uniform color space directly from raw tristimulus values of the imaging device based at least in part on characteristics related to the imaging device, the constructing comprising:
        computing, by the processor, first, second and third perceptual color axes based at least in part on the characteristics related to the imaging device, the first perceptual color axis correlated with lightness, the second perceptual color axis correlated with a first color variation and aligned with daylight variation, the third perceptual color axis correlated with a second color variation and orthogonal to the second perceptual color axis; and
        scaling, by the processor, the first, second and third perceptual color axes so that a resulting distance in the uniform color space approximates a distance of Munsell colors in a CIELAB color space;
    receiving, by the processor, one or more images from the imaging device; and
    performing, by the processor, color adjustment on the one or more images in the constructed uniform color space.

2. The method of claim 1, wherein obtaining characteristics related to the imaging device comprises receiving parameters associated with spectral sensitivity functions of the imaging device.

3. The method of claim 1, wherein obtaining characteristics related to the imaging device comprises:
    using a color checker with a plurality of color patches with known Munsell color notations or known spectral reflectances; and
    receiving a plurality of images of the color checker captured under different phases of daylight by the imaging device.

4. The method of claim 3, wherein the plurality of color patches comprise a series of patches of neutral colors.

5. The method of claim 1, wherein computing first, second and third perceptual color axes comprises:
    computing a daylight plane of the imaging device, a constant lightness plane of Munsell colors with the constant lightness plane having a surface normal vector as the first perceptual color axis, and an intersection line of the daylight plane and the constant lightness plane as the second perceptual color axis based at least in part on the characteristics related to the imaging device; and
    determining a first line as the third perceptual color axis, the first line on the constant lightness plane and orthogonal to the second perceptual color axis.

6. The method of claim 5, wherein the second perceptual color axis comprises a yellow-blue axis.

7. The method of claim 5, wherein the third perceptual color axis comprises an axis of a color correlated with a perceptual red-green axis.

8. The method of claim 1, wherein the scaling comprises scaling with weighted errors so that one or more chosen colors are weighted more heavily relative to other colors to emphasize a fidelity of the one or more chosen colors as represented in the uniform color space.

9. The method of claim 8, wherein the one or more chosen colors comprise at least a color of skin, grass, blue sky, or any other user-chosen color.

10. A method, comprising:
    constructing, by a processor, a uniform color space directly from raw tristimulus values of an imaging device based at least in part on characteristics related to the imaging device; and
    performing, by the processor, color adjustment on one or more images captured by the imaging device in the constructed uniform color space,
    wherein the constructing of the uniform color space comprises:
        reducing, by the processor, a plurality of equations describing the uniform color space into a nonlinear equation with a single variable;
        examining, by the processor, a behavior of the nonlinear equation for a plurality of input ranges to determine a projection for linear approximation;
        solving, by the processor, one or more combinational cases of a third-degree polynomial and a first-degree polynomial from the linear approximation in the projection to provide a solution;
        determining, by the processor, whether the solution is within a color gamut of the imaging device; and
        mapping, by the processor, an out-of-gamut solution into an in-gamut color according to a gamut mapping strategy.

11. A device, comprising:
    a memory configured to store data representative of characteristics related to an imaging device; and
    a processor configured to store data in and access data from the memory, the processor comprising:
        a computation unit configured to compute first, second and third perceptual color axes of a uniform color space based at least in part on the characteristics related to the imaging device; and
        a scaling unit configured to scale the first, second and third perceptual color axes,
    wherein the processor is configured to perform operations comprising:
        constructing the uniform color space directly from raw tristimulus values of the imaging device based at least in part on the characteristics related to the imaging device;
        receiving one or more images from the imaging device; and
        performing color adjustment on the one or more images in the constructed uniform color space.

12. The device of claim 11, wherein the scaling unit is configured to scale the first, second and third perceptual color axes so that a resulting distance in the uniform color space is approximate to a distance of Munsell colors in a CIELAB color space.

13. The device of claim 11, wherein the memory is configured to store parameters associated with spectral sensitivity functions of the imaging device utilized by the computation unit in computing the first, second and third perceptual color axes of the uniform color space.

14. The device of claim 11, wherein the memory is further configured to store a lookup table containing a plurality of results of an inverse transformation of the uniform color space corresponding to a plurality of grid points of the uniform color space.

15. The device of claim 14, wherein the computation unit is further configured to interpolate one or more additional inverse colors in the uniform color space based at least in part on the lookup table.

16. The device of claim 11, wherein the first perceptual color axis correlates with lightness, wherein the second perceptual color axis correlates with yellow-blue color variations, wherein the third perceptual color axis correlates with red-green color variations, and wherein the second perceptual color axis is aligned with daylight variation.

17. The device of claim 11, wherein in computing the first, second and third perceptual color axes of the uniform color space, the computation unit is configured to perform operations comprising:
   computing a daylight plane of the imaging device, a constant lightness plane of Munsell colors with the constant lightness plane having a surface normal vector as the first perceptual color axis, and an intersection line of the daylight plane and the constant lightness plane as the second perceptual color axis based at least in part on the characteristics related to the imaging device; and
   determining a first line as the third perceptual color axis, the first line on the constant lightness plane and orthogonal to the second perceptual color axis.

18. The device of claim 17, wherein the second perceptual color axis comprises a yellow-blue axis.

19. The device of claim 17, wherein the third perceptual color axis comprises an axis of a predefined color correlated with a perceptual red-green axis.

20. The device of claim 11, wherein in scaling the first, second and third perceptual color axes, the scaling unit is configured to scale the first, second and third perceptual color axes with weighted errors so that one or more chosen colors are weighted more heavily relative to other colors to emphasize a fidelity of the one or more chosen colors as represented in the uniform color space.

21. The device of claim 11, further comprising:
   a characteristics obtaining unit configured to obtain the characteristics related to the imaging device by performing operations comprising;
      using a color checker with a plurality of color patches with known Munsell color notations or known spectral reflectances; and
      receiving a plurality of images of the color checker captured under different phases of daylight by the imaging device.

22. The device of claim 21, wherein the plurality of color patches comprise a series of patches of neutral colors.

23. The device of claim 11, further comprising:
   an inverse transformation unit configured to compute an inverse transformation of the uniform color space by performing operations comprising:
      reducing a plurality of equations describing the uniform color space into a nonlinear equation with a single variable;
      examining a behavior of the nonlinear equation for a plurality of input ranges to determine a projection for linear approximation;
      solving one or more combinational cases of a third-degree polynomial and a first-degree polynomial from the linear approximation in the projection to provide a solution;
      determining whether the solution is within a color gamut of the imaging device; and
      mapping an out-of-gamut solution into an in-gamut color according to a gamut mapping strategy.

\* \* \* \* \*